United States Patent

[11] 3,580,655

| [72] | Inventors | Emmett N. Leith<br>Plymouth;<br>Juris Upatnieks, Ann Arbor, both of, Mich. |
|---|---|---|
| [21] | Appl. No. | 503,993 |
| [22] | Filed | Oct. 23, 1965 |
| [45] | Patented | May 25, 1971 |
| [73] | Assignee | The Battelle Development Corporation<br>Columbus, Ohio<br>Continuation-in-part of application Ser. No. 361,977, Apr. 23, 1964. |

[54] WAVEFRONT RECONSTRUCTION
7 Claims, 37 Drawing Figs.

[52] U.S. Cl. .......................................... 350/3.5,
350/162, 355/2
[51] Int. Cl. .............................................. G02b 27/00
[50] Field of Search ............................ 350/3.5,
162 (SF); 96/27 (H); 355/2

[56] References Cited
OTHER REFERENCES

I. Leith et al., JOUR. OF THE OPTICAL SOC. OF AM., Vol. 52, No. 10, Oct., 1962, pp. 1123— 1130 (copy in 350— 3.5)

II. Leith et al., JOUR. OF THE OPTICAL SOC. OF AM., Vol. 54, No. 11, Nov. 1964, pp. 1295— 1301 (copy in 350— 3.5)

Vanderlugt, SIGNAL DETECTION BY COMPLEX SPATIAL FILTERING, Univ. of Michigan, July 1963 (A.D. Report 411,473) (copy in 350— 3.5)

Gabor et al., PHYSICS LETTERS, Vol. 18, No. 2, Aug. 1965, pp. 116— 118 (copy in 350— 3.5)

III. Leith et al., JOUR. OF THE OPTICAL SOC. OF AM., Vol. 54, pp. 579— 580, April 1964 (copy in 350/3.5)

I. Stroke, AN INTRODUCTION OF OPTICS OF COHERENT AND NONCOHERENT ELECTROMAGNETIC RADIATION, of Univ. of Michigan, March 1965 (Call No. QC355.57) pp. 107, 108, 122— 127

II. Stroke, APPLIED PHYSICS LETTERS, Vol. 6, No. 10, May 1965, pp. 201— 203 (copy in 350/3.5)

*Primary Examiner*—David Schonberg
*Assistant Examiner*—Ronald J. Stern
*Attorney*—Gray, Mase and Dunson ABSTRACT: This invention is directed to methods and apparatus for capturing various patterns of electromagnetic energy emanating from or as they are transformed after passing through an object and reproducing or reconstructing those patterns in their original configuration to produce images identical in appearance to the object itself.

PATENTED MAY 25 1971

INVENTORS
EMMETT N. LEITH,
JURIS UPATNIEKS
BY Gray, Mase and
Dunson, ATTORNEYS

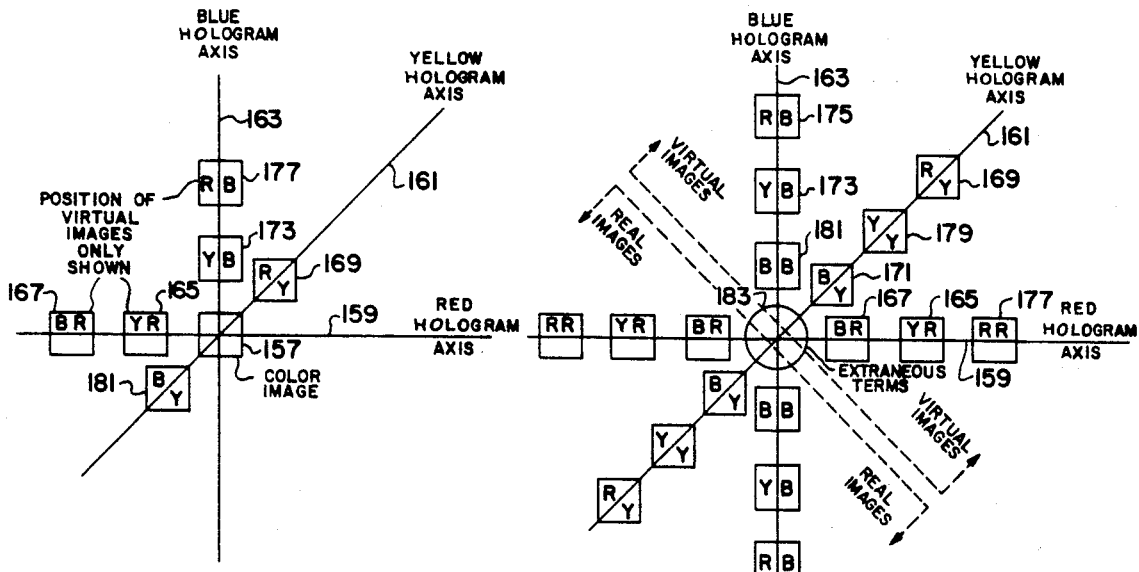
Fig. 23
Fig. 24
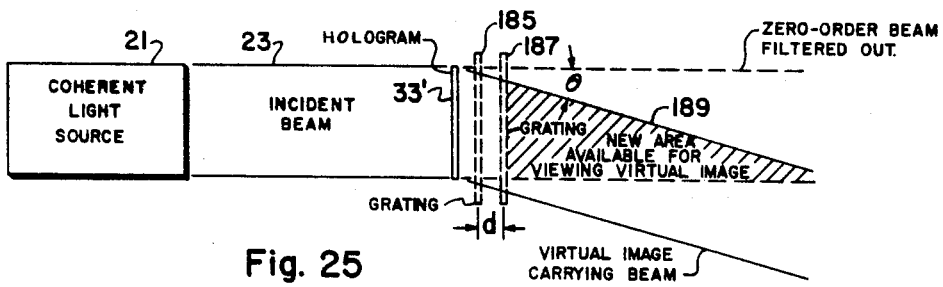
Fig. 25
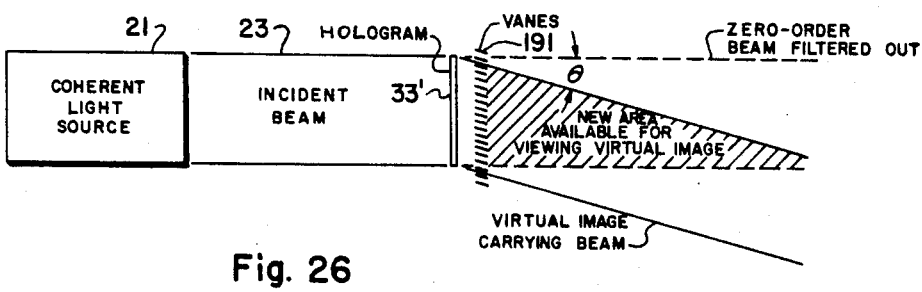
Fig. 26

WAVEFRONT RECONSTRUCTION

This application is a continuation-in-part of our copending application entitled "Wavefront Reconstruction Using a Coherent Reference Beam" Ser. No. 361,977, filed Apr. 23, 1964.

This invention concerns methods and apparatus for producing images without lenses. More particularly, it relates to methods and apparatus for capturing various patterns of electromagnetic energy emanating from or as they are transformed after passing through an object and reproducing or reconstructing those patterns in their original configuration to produce images identical in appearance to the object itself.

The usual method of producing images is by using lenses, or groups of lenses, whereby a light ray is bent or refracted when it strikes the boundary between two transparent substances. In most instances, the two transparent substances are air and a form of glass. The laws that explain the phenomena of reflection and refraction are grouped under a field of study known as geometrical optics. There are other interesting characteristics of light, and the explanation of these depends on the assumption that light consists of waves. The effects that depend upon the wave character of light are classified under the field known as physical optics. Although this invention is based upon principals of both geometrical and physical optics, the explanation of the basic concept is, in general, to be found in the field of physical optics.

The problem of producing clear images, three-dimensional images, colored images, enlarged images, etc., has long been attacked by attempting to provide better lenses, better film emulsion, multiple exposures, and other similar techniques and materials. Usually an image is produced by attempting to reconstruct the light patterns as they exist at the surface of the object. Thus, if one can substantially reproduce all the points on the surface of an object, either as light and dark points or as colored points, the image is considered good. Conventionally a lens, a lens system, or an optical system is used to bend light rays emerging (by reflection or other means) from a point on an object to produce a corresponding point separated in space from the original. A collection of such points forms an image. In seeking to provide a well-constructed image, much time and money are required in prior processes to correct optical system aberrations and to select materials that produce fewer defects in the process of light reflection and transmission.

One object of this invention is to provide a method of recording electromagnetic wavefronts emanating from or through an object and reconstructing the wavefronts substantially identical to their original form.

Another object of this invention is to provide a method of reproducing recorded wavefront information.

Another object of this invention is to provide a system for storing information, such as by "stacking" a number of images on a single photographic plate.

Another object of this invention is to provide a type of microscope that can operate without lenses.

Another object of this invention is to provide color images with black and white photosensitive material.

Another object of this invention is to provide a method or apparatus for correcting aberrations of optical systems.

In this invention, the wavefronts of light rays emerging from an object are captured by a detecting device (preferably a photographic plate or film) to form a pattern and the wavefronts are reconstructed from, and focused by, the detection device to produce an image that has the same characteristics as an image produced by the original object and an aberration-corrected optical system. According to the present invention, if one moves the eye around in the area where the reconstructed wavefronts are focused, one does not see clearly those points that were on a direct line between the object and the detecting device, but one sees new points coming into view as others go out of view, so that one can look "behind" or around structures in the foreground to see structures in the background. The phenomenon gives one the impression that the image is created by a lens system and that the original object is still present, as stated above, or that one is looking through a window at the original object or scene.

Briefly described, this invention includes a method and apparatus for producing images comprising, illuminating an object with a source of coherent light, positioning a detective device to receive light from the object, positioning means for directing a portion of the coherent light onto the detecting device to produce a pattern, and illuminating the pattern on the detector with coherent light to reconstruct a three-dimensional virtual image and a three-dimensional real image.

The pattern recorded on the detecting device is, for convenience, called an off-axis hologram. For convenience, in the description that follows, the coherent radiation is most frequently referred to as "light" since this is generally more comprehensible that other forms of radiation; however, it should be understood that visible and invisible radiation will, in most instances, be applicable to the methods and apparatus described.

A preferred source of coherent light is the light produced by a laser and the preferred detector is a photographic plate. Present lasers do not produce "absolutely" coherent light, but light that is coherent over a distance that is great enough to serve the purposes of the methods and apparatus described herein. Consequently, when the term "coherent" is used herein it refers to light of about laser coherence.

The orientation of the portion of coherent light that is directed onto the detecting device determines the position of the images formed by the off-axis hologram resulting from the interference between the "object-bearing" beam and the directed or reference beam. If one off-axis hologram (with one subject) is formed with the directed light oriented in one manner, and a second off-axis hologram is formed (with a second subject) with the reference light oriented in a second manner, two sets of virtual and real images are formed, focused at different locations, and the images can be viewed separately. This process of "stacking" patterns can be continued within the limits of the density produced on the detector by the stacked pattern.

Each point on the object produces a pattern that extends over the entire detecting means and any portion of that pattern will reproduce that point for reconstruction of the image. Thus, the detecting means can be broken or cut into pieces and from each piece an image the same size as the original but of less intensity can be produced if the intensity of the illuminating source is the same for both forming the off-axis hologram and reproducing the light waves. However, if the illuminating light is concentrated to the size of one piece the image reproduced from that piece retains its original intensity.

The radiation for producing the off-axis hologram, as previously stated, need not be light. Any radiation that can be detected and captured by a detecting device will suffice. For example, photographic plates are sensitive to infrared, ultraviolet, X-rays, and gamma rays. The invention, therefore, operates with many "types" of radiation. With photographic plates as detectors, it is possible to produce images using radiations having wavelengths of from $10^{111}$ cm. to $10^{11}$ cm., the visible spectrum comprising only those wavelengths in the range between $4\times10^{15}$ cm. (extreme violet) and $7.2\times10^{5}$ cm. (deep red). According to this invention, since no lenses are involved, radiation that cannot be refracted by ordinary lenses can be put to use to produce types of images heretofore impossible, for example, magnification of shadow images formed from X-rays produced from a coherent source.

One advantage of this invention is that a few changes in the system can be made to produce images either much larger than the object, or smaller than the object, as desired, thus introducing magnification or miniaturization without lenses.

Another advantage of this invention is that images in color can be produced without the use of color-sensitive film or plates.

Another advantage of this invention is that the detecting device may be used to correct a lens or optical system, eliminating almost all of the monochromatic aberrations that exist in the lens or optical system.

Still another advantage of this invention is that it may employ detecting devices sensitive to all the same radiations as any photographic process, whereby images may be produced with radiations outside the visible spectrum.

Still another advantage of this invention is that magnification does not depend upon an optical system. Even images formed by radiations that cannot be refracted by glass can be enlarged by the method and apparatus of this invention, since lenses need not be involved.

Still another advantage of this invention is that a plurality of off-axis holograms may be recorded on a detecting device and, when the off-axis holograms are reconstructed, each off-axis hologram produces an image focused at a location that is completely separate and distinct from the location of the other images.

Still another advantage of this invention is that the detecting device may be divided into numerous pieces and each piece can be used to reconstruct the total image. Still other objects and advantages of this invention will be apparent from the description that follows, the drawings, and the appended claims.

Figure 4:
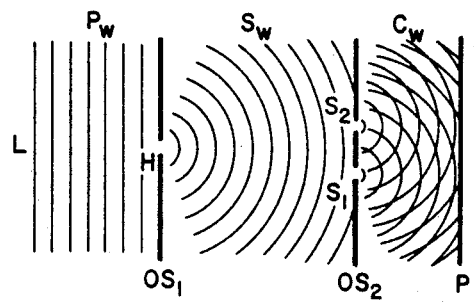
Figure 3A:
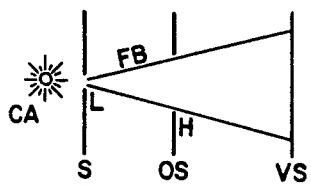
Figure 5:
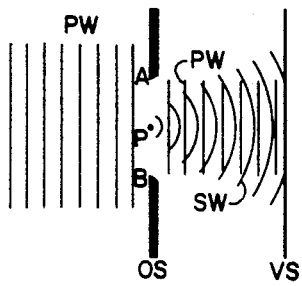
Figure 6:
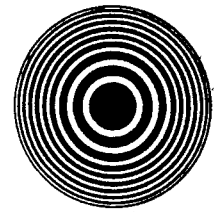
Figure 7:
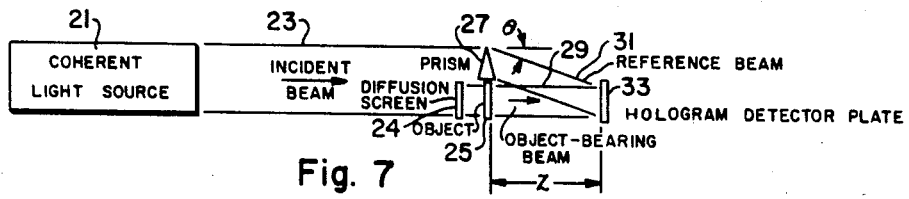
Figure 8:
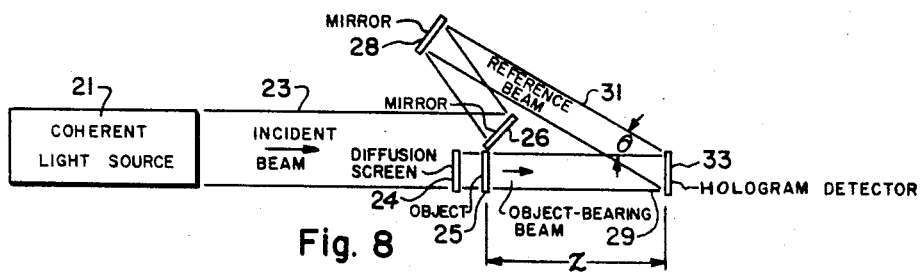
Figure 9:
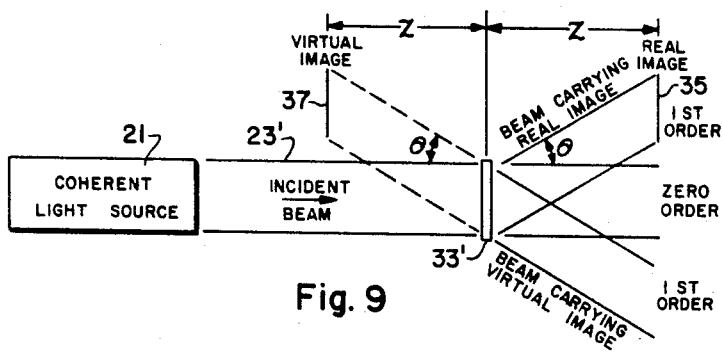
Figure 10:
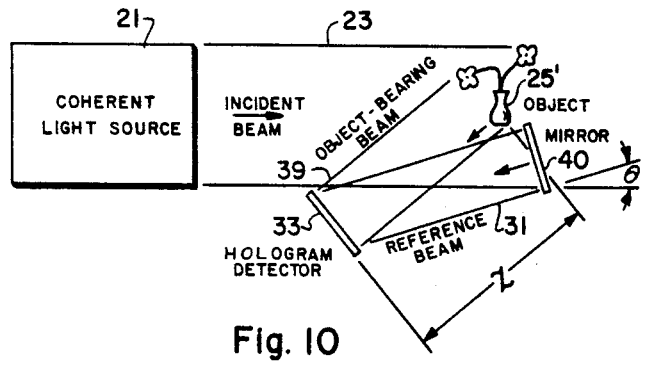
Figure 11:
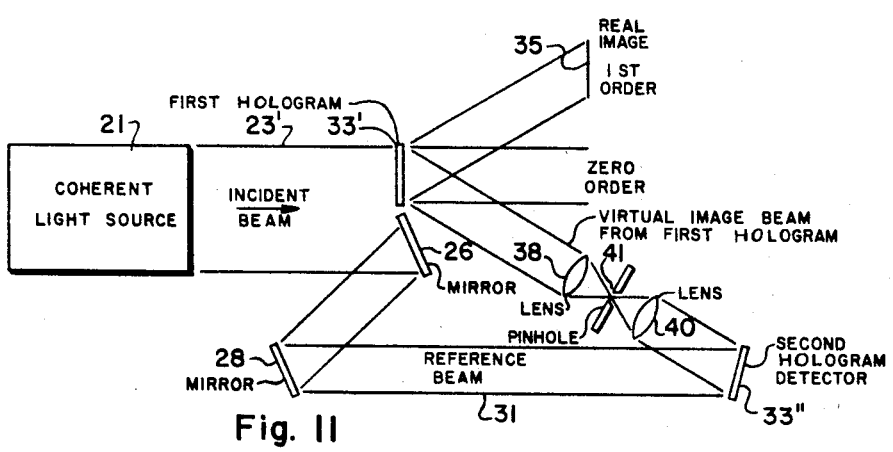
Figure 12:
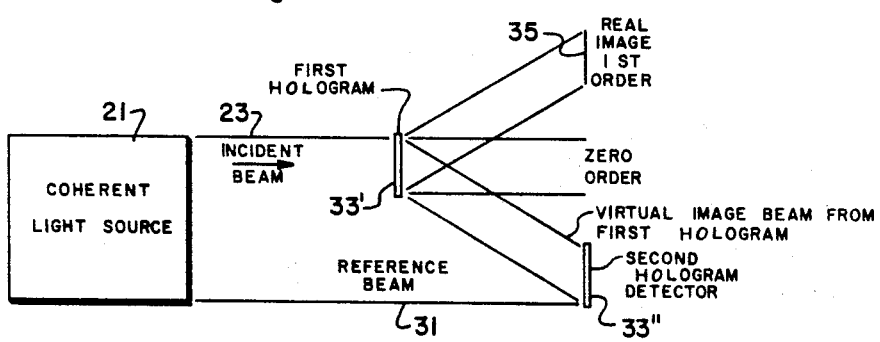
Figure 13:
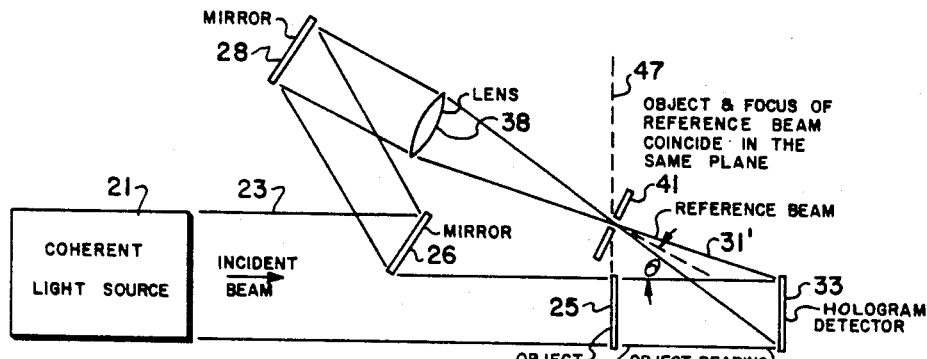
Figure 14:
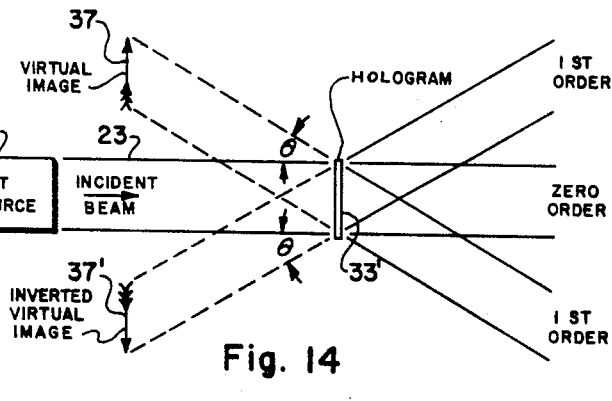
Figure 15:
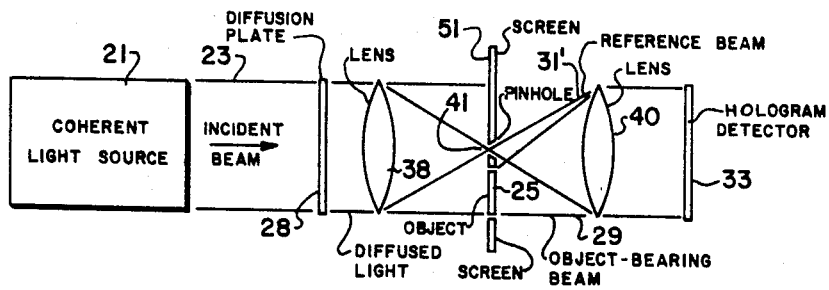
Figure 16:
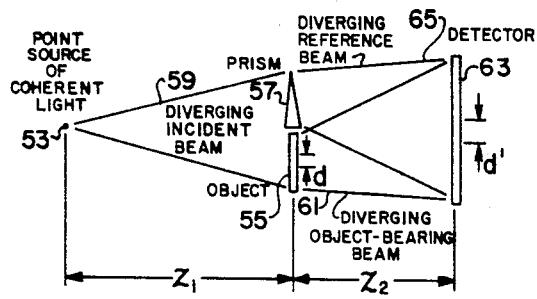
Figure 17:
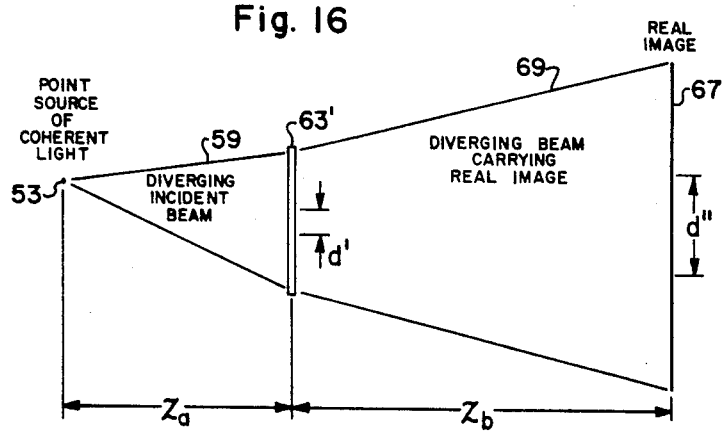
Figure 18:
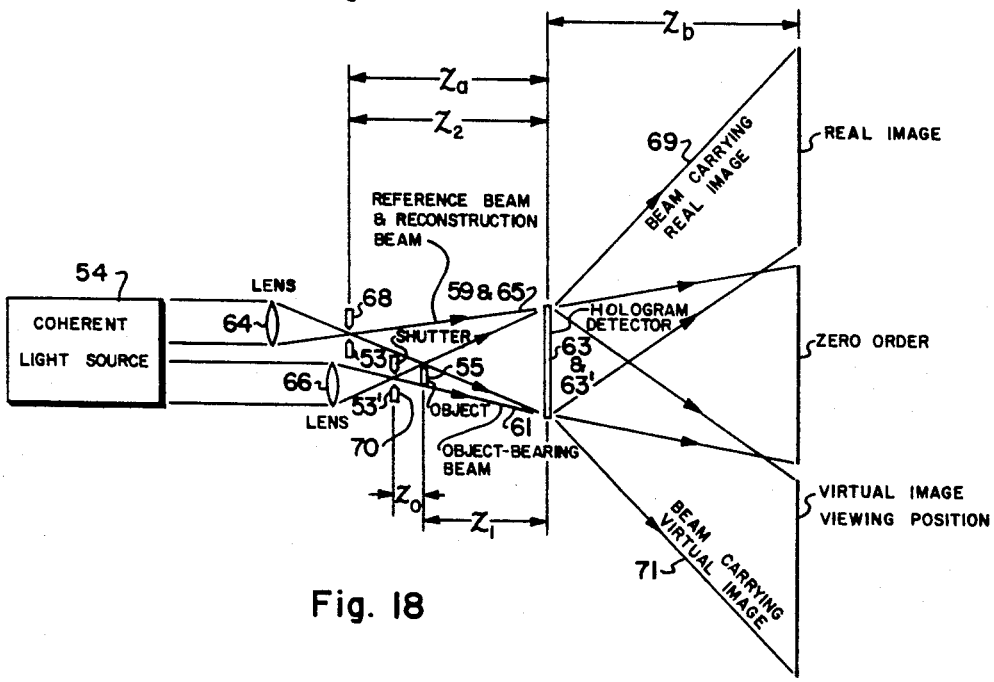
Figure 19:
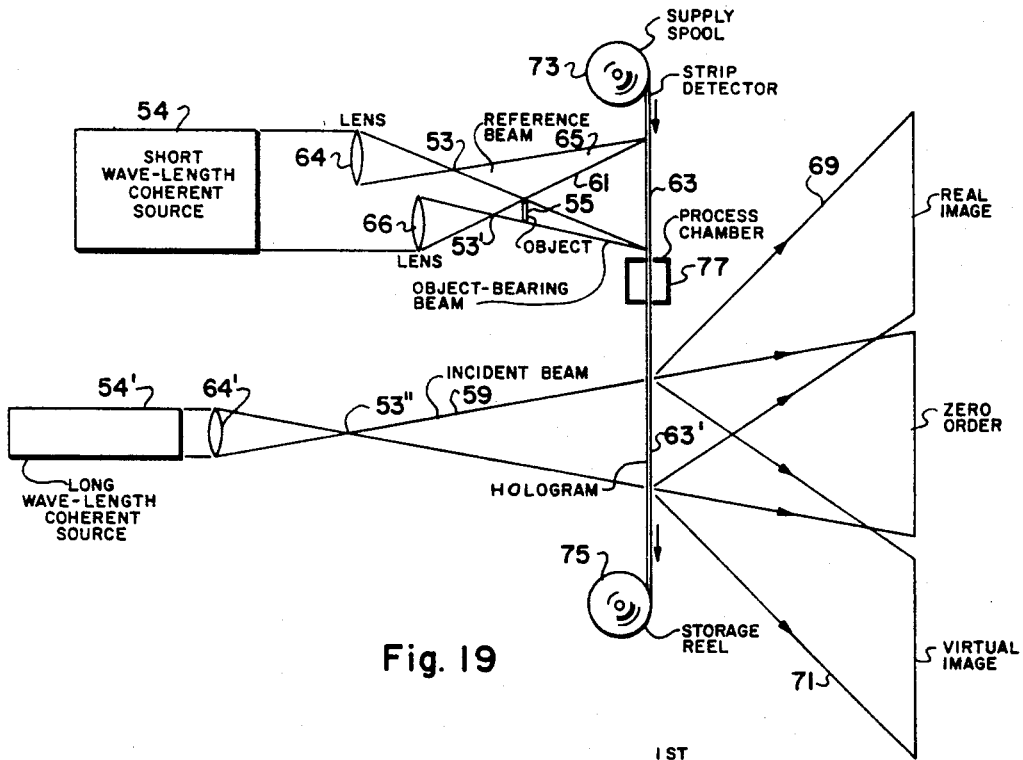
Figure 20A:
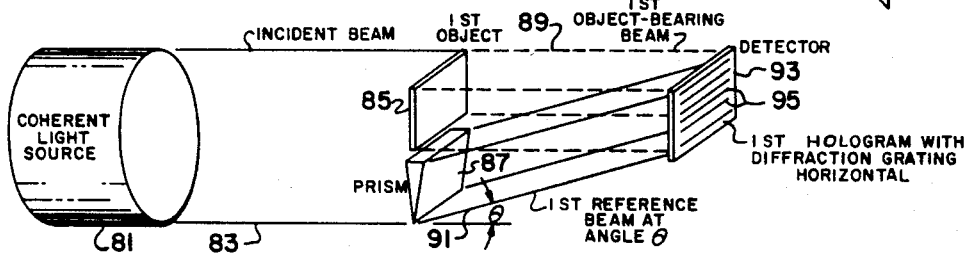
Figure 20B:
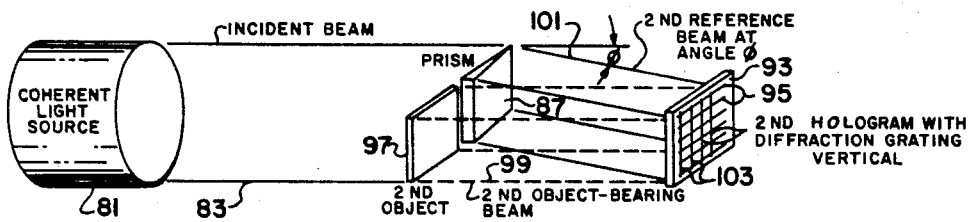
Figure 21:
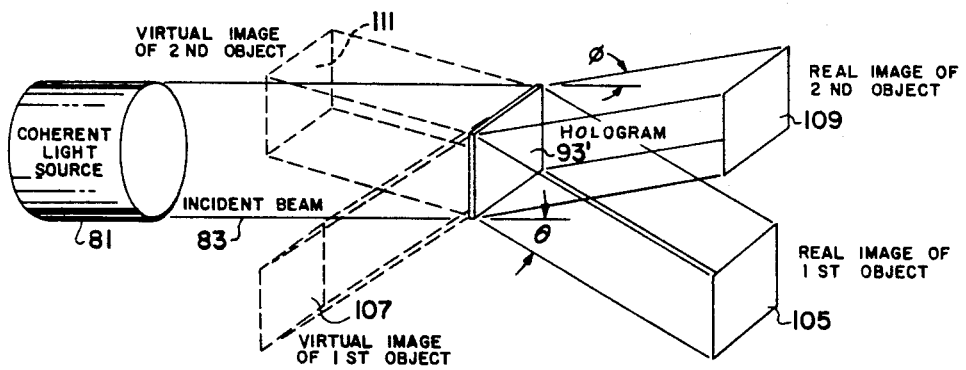
Figure 22:
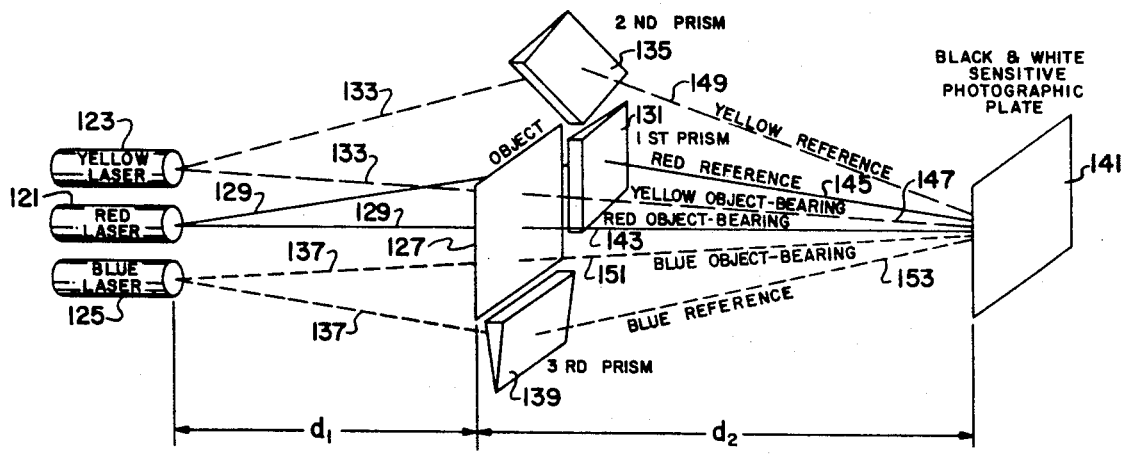
Figure 27:
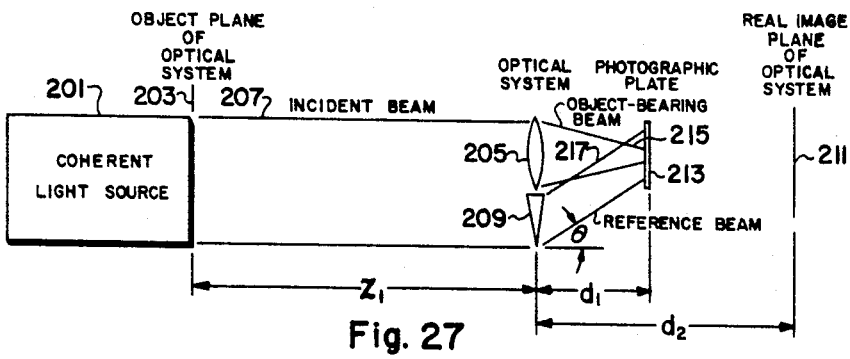
Figure 28:
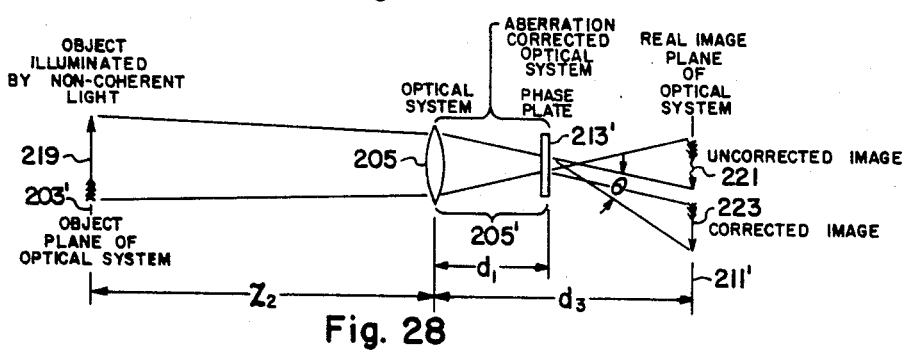
Figure 29:
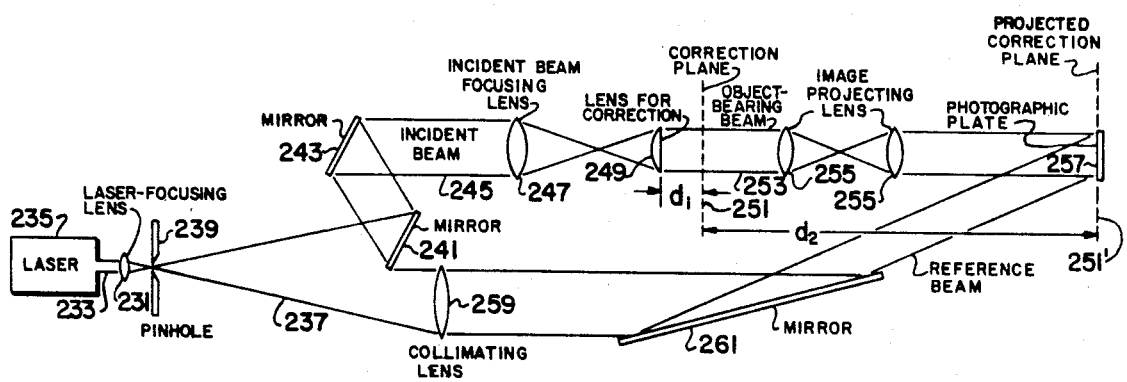
Figure 30:
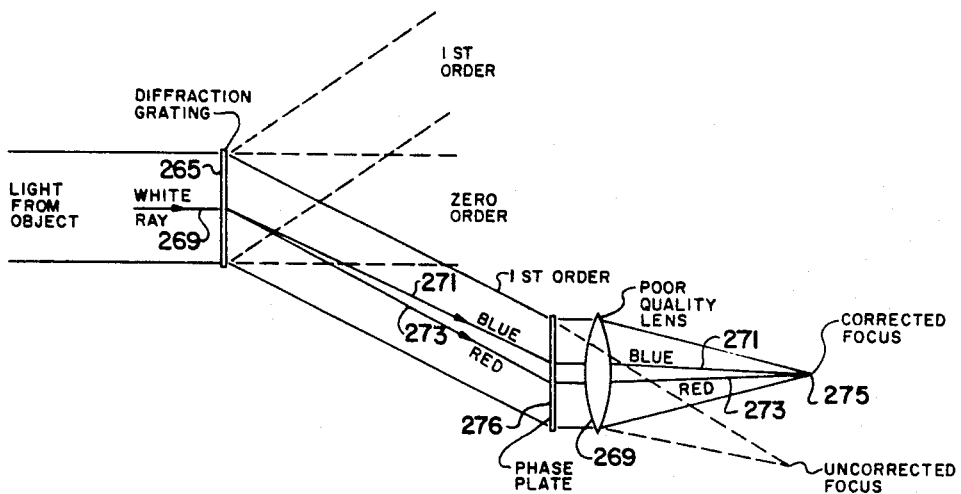
Figure 31:
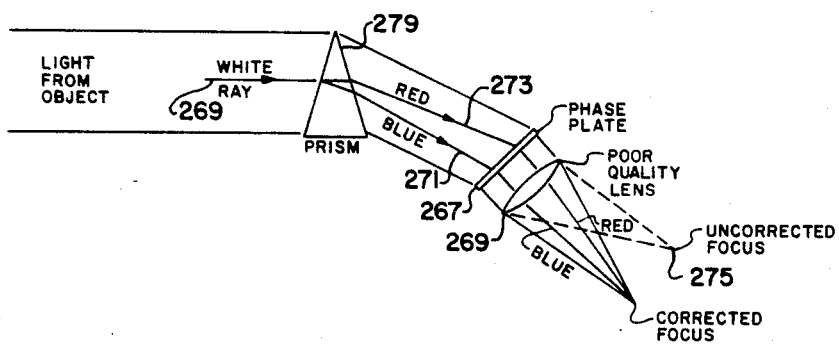
Figure 32:
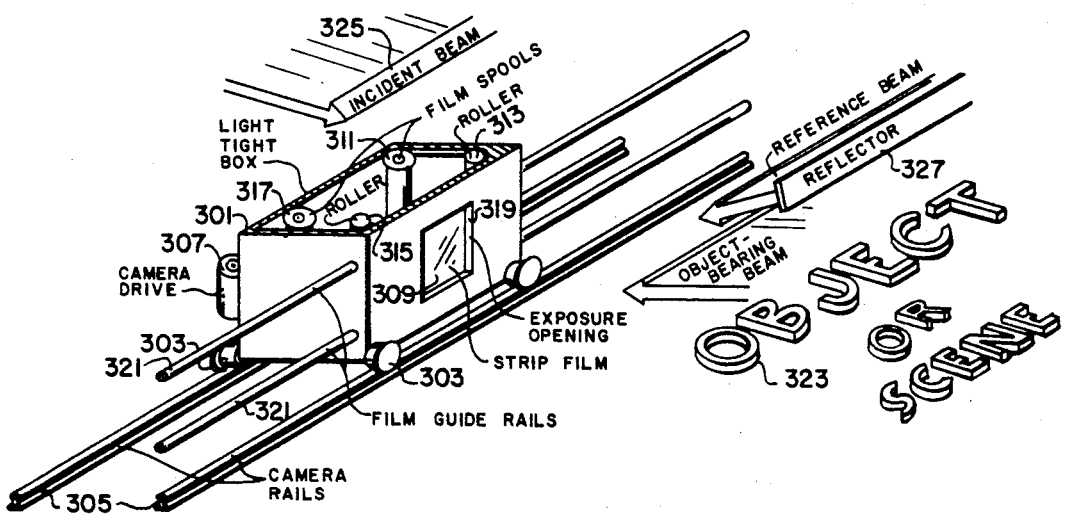
Figure 33:
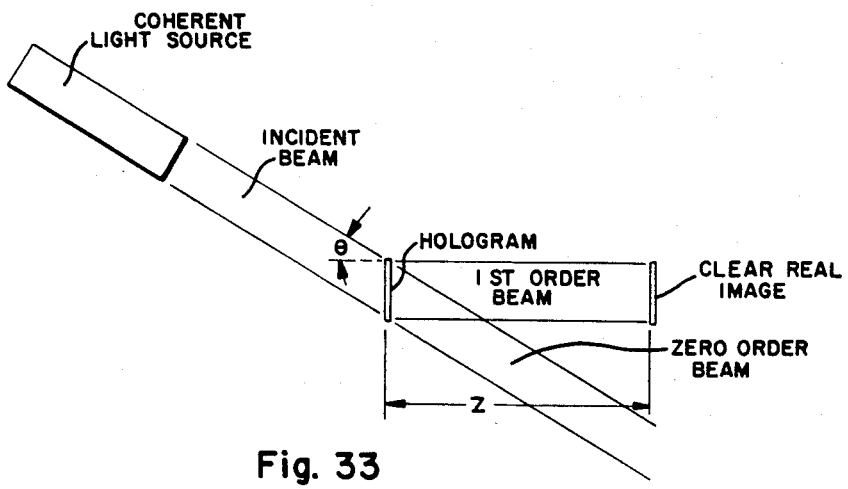

FIGS. 3(a), (b) and (c) are diagrams for demonstrating the diffraction of light;

FIG. 4 is a diagram showing the interference of light from a coherent source passing through two slits;

FIG. 5 is a diagram based on the theory of diffraction of light;

FIG. 6 is a diagram of a Fresnel zone plate;

FIG. 7 is a diagram illustrating a method for producing an off-axis hologram;

FIG. 8 is a diagram illustrating a method similar to that of FIG. 7 for producing an off-axis hologram;

FIG. 9 is a diagram illustrating a method for reconstructing the images from an off-axis hologram;

FIG. 10 is a diagram illustrating a method of producing an off-axis hologram from a solid object;

FIG. 11 is a diagram illustrating a method of producing an off-axis hologram from an off-axis hologram;

FIG. 12 is a diagram illustrating another method of producing an off-axis hologram from an off-axis hologram;

FIG. 13 is a diagram illustrating a method of producing an off-axis hologram by Fraunhofer diffraction;

FIG. 14 is a diagram illustrating a reconstruction of an off-axis hologram produced by the method shown in FIG. 13;

FIG. 15 is a diagram illustrating another method of producing an off-axis hologram by Fraunhofer diffraction;

FIG. 16 is a diagram showing a method of producing magnification of the image in the off-axis hologram forming step;

FIG. 17 is a diagram showing a method of magnifying the image in the reconstruction step;

FIG. 18 is a diagram of an off-axis hologram microscope;

FIG. 19 is a diagram of another embodiment of an off-axis holographic microscope;

FIG. 20(a) and 20(b) are diagrams illustrating a method for recording different objects on one detector;

FIG. 21 is a diagram illustrating the reconstruction of a number of objects "stacked" on a complex off-axis hologram;

FIG. 22 is a diagram showing a method for producing color images with black and white photosensitive material;

FIG. 23 is a diagram showing the pattern of images from a reconstruction of an off-axis hologram produced in accordance with the method shown in FIG. 22;

FIG. 24 is a diagram showing another pattern of images from a reconstruction of an off-axis hologram produced in accordance with the method shown in FIG. 22;

FIG. 25 is a diagram illustrating a method of removing the zero order term in the reconstruction of an off-axis hologram;

FIG. 26 is a diagram illustrating another method of removing the zero order term in the reconstruction of an off-axis hologram;

FIG. 27 is a diagram illustrating a method of producing an optical system corrector plate;

FIG. 28 is a diagram illustrating the use of a corrector plate with an optical system;

FIG. 29 is a diagram illustrating another method of producing a corrector plate for an optical system;

FIG. 30 is a diagram illustrating a method of using an off-axis hologram method of correcting an optical system for chromatic and monochromatic aberrations;

FIG. 31 is a diagram illustrating another method of using an off-axis hologram method of correcting an optical system for chromatic and monochromatic aberrations;

FIG. 32 is a diagram illustrating a method of producing long, strip off-axis holograms; and FIG. 33 is a diagram illustrating a method of reconstructing images related to FIG. 9.

In order to provide a background for understanding the invention described herein, a brief discussion of certain principles in the field of physical optics is given. Amplification of these principles will be found in textbooks dealing with the subject. FIGS. 1—6 are related to the invention only in that they are used to illustrate certain details of this discussion intended to provide background information preliminary to the actual description of the invention.

Figure 1:
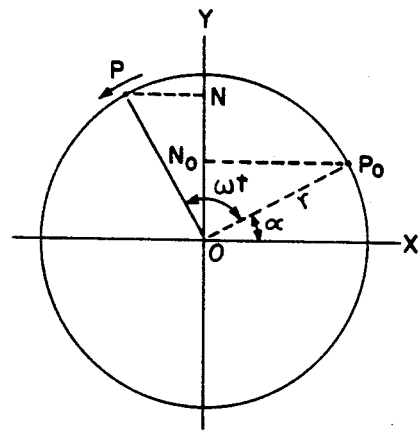
FIG. 1 is a diagram showing a reproduction of the motion of a particle influenced by a sine wave.

According to the theory of wave motion, the passage of a train of waves through a medium sets each particle of the medium into motion. Wave motions can be studied by determining the action of such particles as they are passed by the waves. For example, a particle of water, although participating in the formation and destruction of a passing wave, does not travel with the wave but, ideally, moves up and down in the crest and trough of the waves as it passes. A periodic motion is one which repeats itself exactly in successive intervals of time. At the end of each interval, the position and velocity of the particle is the same as the initial position and velocity and the time between such occurrences is called a period. The simplest type of periodic motion along a straight line is one in which a displacement (designated as $y$) is given by the equation:

$$y = r \sin(\omega t + \alpha) \quad (1)$$

where $r$ is called the amplitude of the motion, $\omega$ is the angular velocity in radians per second, and $t$ is the time in seconds, and $\alpha$ is the phase constant. The entire angle $(\omega t + \alpha)$ determines the position of the particle (N) at any instant and is called the phase angle or simple "the phase." The position of N at zero time ($t=0$) is determined by the angle $\alpha$ which is the initial value of the phase. FIG. 1 shows a construction for determining the position of the particle N at any time. This comprises a circle of radius $r$ having its center at the origin of a coordinate system. The horizontal projection of point P moving on the circumference of such a circle at a constant angular velocity $\omega$, reproduces the displacement of a particle influenced by a sine wave. Point $P_o$, corresponding to the position of the particle at time $t=0$ is displaced from the axis by an angle $\alpha$ and magnitude of the initial displacement is represented by the distance $N_o$ measured along the Y axis. After a period of time the position of the particle ($P_1$) will be determined by the angle $(\omega t + \alpha)$ and the displacement will be $N_1$ measured along the Y axis. As the point P moves around the circle and again arrives at $P_o$, it will have completed a "period" and its projection N will have described one complete cycle of displacement values.

Figure 2:
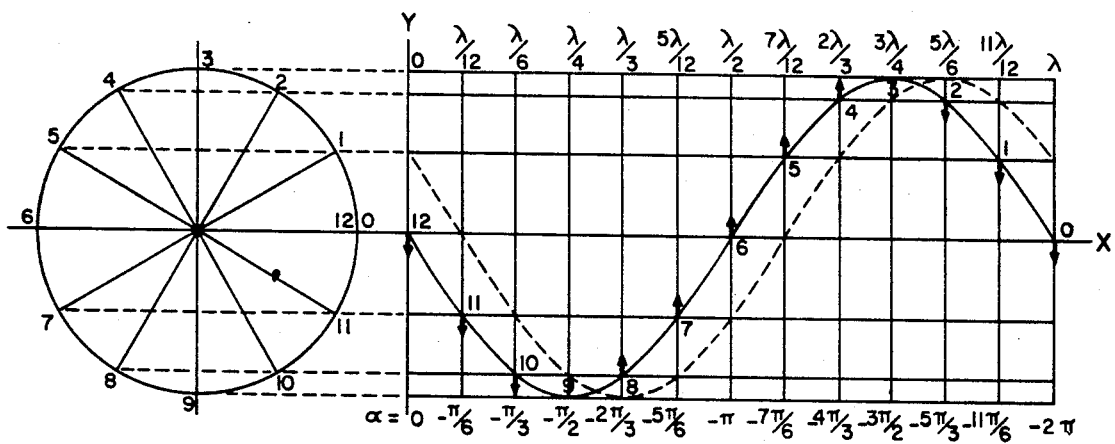
FIG. 2 is a diagram of two sine waves that are 30° out of phase.

FIG. 2 shows graphically the displacement pattern of a particle through one cycle of a sine wave. A group of 12 points has been projected onto a curve, and by connecting such points a picture of the wave appears. A solid line shows a wave where the initial phase angle $\alpha$ was zero, and the broken line shows a wave where the initial phase angle was 30° or $\pi/6$. The direction of motion of the particle at each position, on the solid line, is indicated by the arrows in FIG. 2. The phase difference in the two waves shown is important in that if the two waves were to be projected through the same medium and oriented along the same axis, at the same time, the result of the particle motion would be an addition of the two waves to form a compound wave. At those points where the waves tend to make the particle move in the same direction, the height or depth (intensity) of the compound wave would be increased, and, at those points where the waves tend to influence the particle to move in opposite directions, they tend to cancel each other out so that the resultant compound wave is moved toward the axis along which it travels. The entire length of the wave, or wavelength, is designated $\lambda$. In FIG. 2 the waves are out of phase by the angle $\pi/6$, in distance $1/12$ $\lambda$. If they were out of phase by one-half of a period $\pi$ (or $1/2$ $\lambda$), the peaks and valleys would fall in opposite directions and they would tend to cancel each other out. If the waves were exactly in phase, i.e., on top of one another, the peaks and valleys would reinforce one another so that the resultant compound wave would have twice the amplitude of either single wave.

Figure 3B:
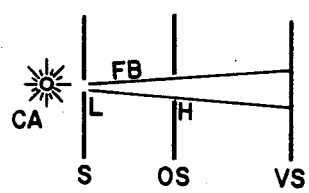
Figure 3C:
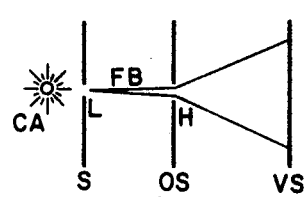

An interesting characteristic of light is exhibited if one attempts to isolate a single "ray" of light by the method shown in FIG. 3. In FIG. 3($a$), a light source of the smallest possible size is represented by L which might be obtained by focusing the light from the white-hot positive pole of a carbon arc (represented by CA) on a metal screen S pierced with a small hole. This is a convenient way of approximating a "point source" of light which produces a type of coherent light. Coherent light is necessary to this invention and is described later. If another opaque screen OS, provided with a much larger hole H, is positioned between L and a viewing screen VS, only that portion of the viewing screen VS lying between the straight lines FB drawn from L will be appreciably illuminated, as shown in FIG. 3($a$). If the hole H is made smaller, as in FIG. 3($b$), the illuminated area on the screen VS gets correspondingly smaller, so that it appears that one could isolate a single ray of light by making the hole H vanishingly small. Experimentation along this line reveals, however, that at a certain width of H (a few tenths of a millimeter) the bright spot begins to widen again (FIG. 3($c$). The result of making the hole H very small is to cause the illumination, although very weak, to spread out over a considerable area of the screen. When waves pass through an aperture or pass the edge of an obstacle, they always spread to some extent into the region which is not directly exposed to the oncoming waves. The failure to isolate a single ray of light by the method described above is due to the process called "diffraction." In order to explain this bending of light, the rule has been proposed that each point on a wave front may be regarded as a new source of waves. The most obvious diffraction effects are produced by opaque obstacles although diffraction is produced by obstacles which are not opaque. For example, diffraction fringes may be produced by air bubbles imprisoned in a lens. Diffraction is produced by any arrangement which causes a change of amplitude or phase which is not the same over the whole area of the wave front. Diffraction thus occurs when there is any limitation on the width of a beam of light.

If one were to drop two stones simultaneously in a quiet pool of water, one would notice two sets of waves crossing each other. In the region of crossing, there are places where the disturbances are practically zero and others where it is greater than that which would be given by either wave alone. This phenomenon, called the principle of superposition, can also be observed with light waves. FIG. 4 is a diagram illustrating such a phenomenon. The light source L, effectively located at infinity (this effect can be accomplished by using a lens that collimates the light), emits parallel waves of light PW. The waves of light PW strike an opaque screen $OS_1$ having a hole H and the light that gets through the hole H diffracts to form spherical waves SW that pass to a second opaque screen $OS_2$. The second opaque screen $OS_2$ has two slits $S_1$ and $S_2$. The light passing through the two slits $S_1$ and $S_2$ is again diffracted, but in this case, since the two openings are slits $S_1$ and $S_2$, the light waves are diffracted in a cylindrical wave front pattern as indicated by the designation CW. If the circular lines, designated CW, represent crests of waves, the intersection of any two lines represents the arrival at these two points of two waves with the same phase, or with phases differing by multiple of $2\pi$ (or $\lambda$). Such points are therefore those of maximum disturbance or brightness. A close examination of the light on the screen P will reveal evenly spaced light and dark bands or fringes.

The two interfering groups of light waves CW are always derived from the same source of light L. If one were to attempt the above experiment using two separate lamp filaments set side by side, no interference fringes would appear. With ordinary lamp filaments, the light is not emitted in an infinite train of waves. Actually, there are sudden changes in phase that occur in a very short interval of time (in about $10^{18}$ seconds). When two separate lamp filaments are used, interference fringes appear but exist for such a very short period of time that they cannot be recorded. Each time there is a phase change in the light emitted from one of the filaments, the light and dark areas of the fringe pattern change position. The light emitted from the two slits $S_1$ and $S_2$ in FIG. 4 (and other similar arrangements) always have point-to-point correspondence of phase, since they are both derived from the same source. If the phase of the light from a point in one slit suddenly shifts, that of the light from the corresponding point in the other slit will shift simultaneously. The result is that the difference in phase between any pair of points in the two slits always remain constant, and so the interference fringes are stationary. If one is to produce an interference pattern with light, the sources must have this point-to-point phase relation and sources that have this relation are called "coherent sources."

If the number of slits in the screen $OS_2$, is increased and the slits are equidistant and of the same width, the screen $OS_2$ becomes a diffraction grating. When this is done, the number of waves of the type CW increases and the number of interference points increases. The result is that the evenly spaced light and dark bands on the screen change their pattern somewhat as the number of slits in increased. The pattern is modified as the number of slits is increased by narrowing the interference maxima (so that the bright bands on the screen are decreased in width). If the screen P in FIG. 4 is a photographic plate, a series of narrow light bands is produced which may in turn serve as a diffraction grating itself. Two kinds of diffraction pattern are recognized and defined by the mathematics that treats them, i.e., Fresnel diffraction and Fraunhofer diffraction. The latter occurs when the screen on which the pattern is observed is at infinite distances; otherwise the diffraction is of the Fresnel type. This invention is mostly concerned with Fresnel diffraction.

Diffraction also occurs with an opening having an opaque point positioned in the opening. FIG. 5 shows the pattern of light waves produced when the light source is positioned at infinity and parallel waves PW arrive at an opening AB in an opaque screen OS. A point P is positioned in the opening AB and acts like a source producing a train of concentric spherical waves SW, centered at the opaque point P. These wavelengths SW combine with the direct beam of waves PW to produce a series of concentric interference rings on the screen VS such as that shown in FIG. 6 wherein each white area of the pattern is equal to each of the other white areas and each are covered by a black ring which is equal to each of the other black areas. This pattern is referred to as a zone plate. If the zone plate pattern is again exposed to coherent light, it will produce a point of light of great intensity on its axis at a distance corresponding to the size of the zones and the wavelength of the light used, i.e., the light is focused by a pattern rather than a lens. The Fresnel zone plate appears to act as a type of lens. Furthermore, if a small object is positioned in the hole AB of the screen OS of FIG. 5, a Fresnel diffraction pattern is formed from the small object. It would appear that it would be possible to capture a multiple Fresnel diffraction pattern for each point on an object and pass the light through the captured multiple pattern to form an image. To a certain extent, this is true, but it is not quite so simple.

Two major difficulties are encountered if one attempts to produce an image by illuminating an object with coherent light using a point source as described above. First, the light from a point source is very weak. This difficulty is overcome by using the light emitted from a laser. Laser light has the property of point-to-point correspondence of phase, which simply means it produces the coherent light necessary for generating the Fresnel diffraction pattern. Assume that a laser beam is directed onto a photographic transparency and that a photographic plate is positioned to capture the Fresnel diffraction patterns resulting therefrom. When coherent light is directed onto the developed plate, a crude image appears. This occurs only with a relatively simple object that transmits a large portion of the light through the object without scattering. The primary difficulty with the process (and accordingly with many three-dimensional imaging processes) is that the phase of the incident beam (the beam directed onto the transparency) is lost. This, in general, makes the reconstruction of an image impossible. If a portion of the light passing through the transparency is not scattered, some of the phase is retained, so that the reconstruction of very simple objects, such as black lettering on a white background, is possible. When the object illuminated is more complicated, the loss of phase exacts its toll and light "noise" is generated so as to completely obscure the image if one attempts to reconstruct it. The above process was developed by Dr. D. Gabor of England in 1949 and the captured pattern was called a hologram.

A two-beam interferometric process may be used to produce a pattern of fringes on a detecting device (such as a photographic plate), and this is called an off-axis hologram. FIG. 7 shows this process in operation. A coherent light source, such as a laser 21, produces an incident beam 23 illuminating a transparency or object 25 and a prism 27. In order to produce images of improved quality, a diffusion screen 24 (such as a ground glass) is placed between a light source 21 and the object 25. The light passing through the transparency produces a beam of scattered light 29 that carries the Fresnel diffraction pattern of each point on the object 25, some of which is captured by a detector such as a photographic plate 23 positioned at a distance $z$ from the object 25. The phase relationship in the beam 29 is almost completely destroyed. The prism 27 bends the other portion of the incident beam 23 through an angle directing a beam of light 31 onto the plate 33. This light in beam 31 has retained its phase relationship and produces a pattern of interference fringes with the Fresnel fringes being transmitted in beam 29. The result is a combination of multiple Fresnel patterns and interference fringes, producing an off-axis hologram. The incident beam 23, deflected through an angle $\theta$, to form the reference beam 31, is preferably about 2 to 10 times stronger in intensity than beam 29.

FIG. 8 shows a second method of producing an off-axis hologram. The difference between the arrangement shown in FIG. 7 and that of FIG. 8 is that a first mirror 26 is positioned in the incident beam 23 and reflects a portion of the incident beam 23 to a second mirror 28 which in turn reflects the light as a reference beam 31 onto the plate 33. This produces the same result as that of FIG. 7. Still another method (not shown) is to place a beam splitter in the incident beam so that part of the light passes to the object and the other portion is reflected to a mirror that reflects light to the plate to form the reference beam.

After the photographic plate is developed, reconstruction is accomplished according to the diagram of FIG. 9. The off-axis hologram 33' is illuminated by an incident beam 23 of coherent light and a real image 35 forms at a distance $z$ on one side of the off-axis hologram 33', and a virtual image 37 forms at a distance $z$ on the other side of the off-axis hologram 33'. The fine line structure of the off-axis hologram 33' causes the off-axis hologram 33' to act like a diffraction grating, producing a first-order pair of diffracted waves, as shown in FIG. 9. One of these produces the real image 35, occurring in the same plane as a conventional real image, but displaced to an off-axis position through the angle $\theta$. The angle $\theta$ and the distance $z$ will be the same in the reconstruction process as they were in the off-axis hologram forming process if the same wavelength of light is used in both instances. The images 35 and 37 are of high quality and either the real image 35 of virtual image 37 can be photographed. The real image 35 is more convenient to use since the real image 35 can be recorded by placing a plate at the image position, determined by the distance $z$ and the angle $\theta$, thus avoiding the need for a lens. Hence, the entire process may be carried out without lenses.

The density pattern produced on the plate 33 is such that if one wanted to produce the off-axis hologram 33' artificially, for example, by hand-drawing the appropriate pattern and photographing it onto a plate, one would do so in the following manner: each point on the object interferes with the reference beam to produce a fringe pattern in which the fringes are circular and concentric, with the outer fringes being more closely packed than the inner ones. The fringe pattern is like a section taken from the Fresnel zone plate (FIG. 6) except that the fringes are shaded, going gradually from transparent to black and then to transparent, whereas the fringes of the usual Fresnel zone plates go from transparent to black in a single, abrupt step. If an object is thought of as a summation of many points, then each point produces a pattern like the one described, but such pattern is displaced from those produced by other points in the same manner that the points themselves are displaced from each other. The off-axis hologram is thus a summation of many such zone-plate sections, and one could produce an artificial off-axis hologram by drawing a superimposed zoned plate pattern. Of course, the process would be very difficult and could only be done for the simplest objects.

In the absence of the reference beam 31, the photographic plate 33 produces a conventional diffraction pattern. Let the light reflected by the object be a function S of $x$ and $y$, i.e., $S(x,y)$ and the photographic plate receive the light in accordance with the function $S_o$ of $x$ and $y$ or $S_o(x,y)$. The function $S_o(x,y)$ is a complex quantity having both amplitude and phase, the polar form of which is $$S_o(x,y) = a(x,y)e^{j\phi}(x,y) \quad (2)$$

where $a$ is the amplitude modulus and $\Phi$ is the phase of the impinging light. The photographic plate records only the amplitude factor $a$; the phase portion $e^{j\phi}$ is discarded. The conventional fringe pattern is thus an incomplete record.

The interference pattern produced when the second beam, which is called the reference beam 31, is present, is called an off-axis hologram 33'. It is characterized by the fact that the phase portion $\Phi$ of the Fresnel diffraction pattern is also recorded. If the reference beam 31 has an amplitude modulus $a_o$, it will produce at the detector or photographic plate 33, a wave of amplitude $a_o e^{j\alpha x}$, where the phase term $e^{j\alpha x}$ results from the beam impinging on the plate 33 at an angle. A beam impinging on a plane at an angle $\theta$ produces (for small values of $\theta$) a progressive phase retardation factor indicated by the exponent $(j2\pi\chi\theta/\lambda)$ across this plane. Hence we have the relation $\alpha = 2\pi\theta/\lambda$.

When the reference beam is present, the light distribution at the off-axis hologram recording plane is $a_o e^{j\alpha x} + a e^{j\phi}$. Let us assume that the plate which records this distribution has a response which is linear with intensity, that is, suppose the amplitude transmittance of the plate after development to be given by $$T = T_o - kI \quad (3)$$

where $I$ is the intensity distribution at the photographic plate 33, $$I = |a_o e^{j\alpha x} + a e^{j\phi}|^2 \quad (4)$$

and $T_o$ and $k$ are constants determined by the transmittance exposure characteristic of the plate. Equation (3) is, in general, a reasonable approximation to the actual characteristic over a transmittance between about 0.2 and 0.8, measured relative to the base transmittance. The resultant transmittance of the recording plate is, therefore, $$T = T_o - k|a_o e^{j\alpha x} + a e^{j\phi}|^2$$
$$= T_o - ka_o^2 - ka^2 - ka_o a \cos(\alpha x - \Phi) \quad (5)$$

the plate thus behaves like a square-law modulating device producing a term $2ka_o a \cos(\alpha x - \Phi)$ which is the real part of the original Fresnel diffraction pattern, modulated onto a carrier of angular frequency $\alpha$. In the absence of a diffracting object, this term represents a uniform fringe pattern produced by the interference between the two beams. When a diffracting object is present, its Fresnel diffraction pattern modulates this fringe pattern. The amplitude modulus of the diffracting pattern produces an amplitude modulation of the fringes; and the phase portion $\Phi$ produces a phase modulation (or spacing modulation) of the fringes.

The present process permits the photographic plate to record both the amplitude modulus and the phase of the Fresnel diffraction pattern. The complete demonstration of this requires that the final term of equation (5) be separable from the remaining terms. The actual method for the reconstruction process has been described and discussed with reference to FIG. 9.

When the off-axis hologram 33' is placed in the collimated beam of monochromatic light, as shown in FIG. 9, the bias term $T_o - ka_o^2$ and the term $ka^2$ combine to form a reconstruction that is essentially the reconstruction produced by the pattern formed when the carrier 31 is not used. From these terms, a real image is formed at a distance $z$ on one side of the off-axis hologram 33' and a virtual image is formed at an equal distance on the other side of the off-axis hologram 33' (these are the low quality conventional images). As was previously mentioned, the fine-line structure of the off-axis hologram which causes the off-axis hologram to act like a diffraction grating produces a pair of first-order diffracted waves from the term $ka_o a \cos(\alpha \chi - \Phi)$. As seen from FIG. 9, the light component comprising the two off-axis images are nonoverlapping and both components are removed from the region where the conventional reconstruction occurs (these two images are the high-quality images that we seek). A comprehensive mathematical analysis supporting these contentions can be given. However, for the present purpose, if the term $ka_o a \cos(\alpha \chi - \Phi)$ of equation (5) is rewritten in its exponential form, $$(1/2)ka_o a e^{i(\alpha x - \phi)} + (1/2)ka_o a e^{-i(\alpha x - \phi)}$$

it is seen that the first exponential term is to within a constant multiplier and the exponential term $e^{i\alpha x}$, exactly the complex function that describes the Fresnel diffraction pattern produced at the plate 33 by the object 25. This term can therefore be considered as having been produced by a virtual image at a distance $z$ from the off-axis hologram 33'. The factor $e^{i\alpha x}$ alters this view only in that it results in the virtual image being displaced laterally a distance proportionate to $\alpha$. The conjugate term $(1/2)a_o a e^{-i(\alpha x - \phi)}$ produces the real image, which likewise is displaced from the axis, as implied by the factor $e^{-i(\alpha x - \phi)}$.

The results of the method just described are based on the square-law characteristic of the recording plate, as given by equation (3) and the proper term for the recording plate is a "square-law detector." If this relation is only approximately obtained, there will be higher-order distortion terms present on the off-axis hologram. These will, for the most part, give rise to second and higher-order diffracted waves, which, in the reconstruction process, will form additional images at greater off-axis positions, and will therefore be separated from the first-order images. Hence, while the production of higher-order diffracted waves is assumed to be a specific and approximately realized film characteristic, the actual characteristic is not at all critical to the process, and in no way is it necessary or apparently even desirable to consider controlling this characteristic.

By controlling the relative amplitude of the object-bearing beam 29, for example, by the use of attenuating filters placed in one of the beams, the contrast of the fringe pattern can be controlled. If this contrast were made sufficiently small by attenuating the object-bearing beam, then equation (3) would certainly be made to hold to great accuracy if this were desired. However, if the fringe contrast is too low, the reconstructed image will tend to be grainy. Good reconstructions are, in practice, possible over a wide range of fringe contrasts.

One feature of interest is that the reconstructed image is positive, that is, it has the same polarity as the original object. If the off-axis hologram is contact-printed so as to produce a negative of the original off-axis hologram, then this negative off-axis hologram also produces a positive reconstruction. However, certain features of the off-axis hologram are lost in reproducing an off-axis hologram by contact printing and there are more desirable methods of reproducing an off-axis hologram and such methods are described subsequently.

FIG. 10 shows a method of producing an off-axis hologram using an opaque object 25'. The illuminating light, i.e., the incident beam 23, is coherent light from a source such as a laser 21. A diffusion screen (such as the diffusion screen 24 of FIG. 7) may be placed between the light source 21 and the object 25'. The object 25', which may be any complex pattern, reflects light to a photographic plate 33, as shown by the object-bearing beam 39. A portion of the incident beam 23 is reflected to the photographic plate 33 by a mirror 40, as shown by the reference beam 31. The photographic plate is placed any distance $z$ from the object 25' and the incident beam is reflected through the angle $\theta$. The interference of the two beams 39 and 31 produces an off-axis hologram on the photographic plate 33. After the plate 33 is developed, the semitransparent plate 33' is placed in the beam 23 of coherent light, as shown in FIG. 9, and the virtual and real images 35 and 37 appear as three-dimensional images. Both images are a reconstruction of the original object. In the reconstruction, the images are positioned at a distance $z$ and at angle $\theta$ as shown in FIG. 9.

The reproduction or copying of off-axis holograms is relatively difficult since they often contain spatial frequencies in the range of 300—1000 lines/mm. Contact printing, although successful to some extent, produces a copy of inferior quality when compared to the original. Imaging of the off-axis hologram cannot be done since an ordinary lens has a frequency response of 100—300 lines/mm. Off-axis holograms can be imaged, however, if the carrier frequency is removed and is reintroduced at the imaged off-axis hologram.

FIG. 11 shows a method of producing a second off-axis hologram from a first actinogram. The first actinogram 33' is placed in an incident beam of light 23 from a coherent source 21. A first order beam is focused by means of two lenses 38 and 40 on a detector 33'', that is, the surface of first off-axis hologram is focused on detector 33''. The lenses 38 and 40 have equal focal lengths and are spaced at a distance of twice the focal length of one lens. A pinhole 41 may be positioned at the focal point between the two lenses to reduce the effect of any aberration from lens 38. A reference beam from the coherent source 21 is also directed onto the detector 33'' by means of mirrors 26 and 28. This method removes and reintroduces the carrier frequency at the plane of the second off-axis hologram. The first off-axis hologram has information recorded in the form of $$a_o^2 + a^2 + a_o a e^{i[\phi(x,y) - \omega x]} + a_o a e^{-i[\phi(x,y) - \omega x]}$$

where $a_o a e^{\pm i\phi(x,y)}$ is the desired information-carrying term. The term often has sufficiently low spatial frequency that it can be imaged by using lenses as shown in FIG. 11. The other terms of the equation are removed by spatial filtering. The reproduced off-axis hologram 33'' (second off-axis hologram) may have a different carrier frequency and can also be magnified if desired by choosing different lenses than lenses 38 and 40. The second off-axis hologram 33'' will have the form $$a_1^2 + a^2 + a_1 a e^{i[\phi(x',y') - \omega_2 x']} + a_1 a e^{-i[\phi(x',y') - \omega_2 x']}$$

and therefore has the same information as the first off-axis hologram. (The primes refer to the coordinates of the second off-axis hologram.

Another technique of obtaining a second off-axis hologram from a first off-axis hologram is shown in FIG. 12. In this case lenses are not used. A first off-axis hologram 33' is placed in an incident beam of light 23 from a coherent source 21 and a detector 33'' is positioned in one of the reconstructed side bands. A portion of the incident beam 23 serves as a reference beam 31 to produce a second off-axis hologram on the detector 33''. The recorded virtual image from the second off-axis hologram usually gives an observer the feeling that he is viewing an object through two windows, one of the size of the first off-axis hologram and the other the size of the second off-axis hologram. The advantage of the method of FIG. 12 is that it is quite simple and the spatial frequency content of the original is not restricted by lens aperture.

FIG. 13 shows still another method of producing an off-axis hologram. The results of the method of FIG. 13 are slightly different than the results obtained by the methods of FIGS. 7 and 8. An incident beam 23 from a coherent light source 21 illuminates the object 25 and a portion also falls on a mirror 26. The light striking mirror 26 is reflected to a second mirror 28 and is then passed through a lens 38. The lens 38 brings the light to a point focus at a plane 47 which coincides with the plane of the object 25. A pinhole 41 is positioned at the point focus to aid in the removal of aberrations of the lens 38. The focused light becomes the reference beam 31' and interferes with the light from the object 25. The object bearing beam 29 and reference beam 31' are directed onto the off-axis hologram detector 33.

FIG. 14 shows the reconstruction from the off-axis hologram produced according to the method shown in FIG. 13. Off-axis hologram 33' is placed in the incident beam 23 from a coherent light source 21 and two first order images are reformed similar to those of FIG. 9 except that both images are in the position of virtual images and one of the images is inverted. Both diffraction patterns form in an off-axis position and at an angle $\theta$ corresponding to the angle $\theta$ of the reference beam in FIG. 13. If the eye is positioned close enough to the off-axis hologram 33' both images 37 and 37' can be viewed simultaneously.

FIG. 15 shows still another method of forming an off-axis hologram and differs from the method of FIGS. 7 and 8 in that the method depends on Fraunhofer diffraction rather than Fresnel diffraction. The incident beam 23, from a coherent light source 21, is directed onto a diffusion screen 24. The diffusion plate 24 diffuses only a portion of the transmitted light. A lens 38 brings the nondiffused portion to a point focus at a pinhole 41. The diffused light is transmitted to a screen 51 which also has an opening for a transparency or object 25 positioned to one side of the point image. The opaque screen 51 blocks the remainder of the diffused light allowing the light from the pinhole 41 and the light transmitted to the object 25 to pass to a second lens 40. The light from the pinhole 31' becomes the reference beam and the transmitted light from the object 25 becomes the object bearing beam 29. The second lens 40 collimates the light from the reference beam 31' and the off-axis hologram is formed at the detector 33. The reconstruction is accomplished in the same manner as that shown in FIG. 14. To be absolutely correct the two images can no longer be designated as real and virtual images since both form at infinity. They are symmetrically positioned about the zero order spectrum, the off-axis angle will depend on the angle of divergence of the reference beam.

The mathematical description of two-beam off-axis holograms given previously is not entirely applicable to this configuration, so that a second analysis is necessary. The semidiffusing plate 24 has the amplitude of transmittance $$t(x,y) = a_o + n(x,y), \quad (6)$$

where $a_o$ and $n(x,y)$ give rise to the nonscattered and scattered components of transmitted light, respectively; $n(x,y)$ can be thought of as a random or noiselike quantity. The lens 38 produces the Fourier transform of equation (6), producing at the screen 51 a distribution of light whose vector amplitude is represented by the function.

$$T(\xi,\eta) = a\delta(\xi,\eta) + N(\xi,\eta) \quad (7)$$

where $\delta(\xi,\eta)$ is the Dirac delta function, $N(\xi,\eta)$ is the Fourier transform of $n(x,y)$, and $o,\eta$ are spatial-frequency variables arising from the Fourier transformation.

Since the object transparency is introduced at the screen 51, which we have designated the Fourier transform or spatial-frequency plane, the transparency will be designated as $S(\xi,\eta)$. This function is multiplied with $N(\xi,\eta)$, and the lens 40 takes a second Fourier transformation, producing $$\chi(x,y) = a_o + n(x,y) * s(x,y), \quad (8)$$

where $s(x,y)$ is the Fourier transform of the object transparency $S(\xi,\eta)$, and the * indicates a convolution.

The recording process produces a square-law detection, resulting in $$|\chi(x,y)|^2 = |a_o|^2 + |s_o(x,y)|^2 + a_o s_o(x,y) + a s_o^*(x,y), \quad (9)$$

where $s_o(x,y) = n(x,y) * s(x,y)$.

The reconstruction is then accomplished by placing the off-axis hologram in a beam of coherent light and using a lens to take the Fourier transform of the off-axis hologram, producing the result shown in FIG. 14. This lens can be that of the eye, if the observer looks through the coherently illuminated off-axis hologram. In the Fourier transform plane, the term $a_o^2$ is just the attenuated image of the Dirac delta function that produced the reference beam. The term $|s_o|^2$ produces the noiselike distribution of light around the source and can readily be discerned when the off-axis hologram is viewed in accordance with the diagram of FIG. 14.

The two remaining terms have, respectively, the Fourier transforms $a_o N(\xi,\eta) s_o(\xi,\eta)$ and $a_o N^*(-\xi,-\eta)\chi S_o^*(-\xi,-\eta)$. The first is an image reconstructed just as the original object appeared in the diffused illumination. The second is a similar object, but each point on this image is reflected about the origin with respect to the corresponding point in the first image. This is the image that is generated by the square-law process and corresponds to the real image in the case of the Fresnel diffraction off-axis hologram.

The invention can also be embodied in a lensless microscope by a two-step imaging process as illustrated in FIGS. 16 and 17. The magnifications are as great as any optical microscope and this lensless microscope operates with little or no aberrations over a large field. Referring to FIG. 16, a point source 53 of diverging coherent light illuminates an object 55 and a prism 57 with a diverging incident beam 59. A diverging object-bearing beam 61 is transmitted to a detector 63 and a diverging reference beam 65 refracts light onto the detector 63. The object 55 is placed at a distance $z_1$ from the point source 53 and the detector 63 is placed at a distance $z_2$ from the object.

FIG. 17 is a diagram showing the developed off-axis hologram 63' positioned in the diverging incident beam 59 originating from the point source 53 at a distance $z_1$ from the off-axis hologram 63'. A real image 67 is produced by the diverging beam 69 and may be observed or recorded in a plane at a distance $z_b$ from the off-axis hologram 63'.

To calculate the magnification of the process, note first the magnification produced in the first step of the process shown by the diagram of FIG. 16. Consider two points on the object 55, separated by a distance $d$. The Fresnel diffraction patterns of these points are similar but separated on the detector 63 by a distance, $$d' = d \frac{z_2 + z_1}{z_1}$$

The magnification ($M_1$) of the first step is therefore $$M_1 = \frac{d'}{d} = \frac{z_2 + z_1}{z_1} \quad (10)$$

The magnification ($M_2$) produced by the reconstruction process is less obvious. Referring now to FIG. 17, let the off-axis hologram 63' be placed at a distance $z_a$ from the source 53, and suppose a real image 67 is formed at a distance $z_b$ from the off-axis hologram. Again consider the object 55 to have had two points separated by $d$. Their Fresnel diffraction patterns are separated by a distance $d'$ on the off-axis hologram 63'. These diffraction patterns act like a zone plate of FIG. 6, bringing the incident light from the beam 59 to a focus. Each zone plate produces a point focus, whose separation is shown as $d''$ (FIG. 17) and is determined by $$d'' = d' \frac{z_a + z_b}{z_a} \qquad (11)$$

The magnification ($M_2$) of the second step is given by $$M_2 = \frac{d''}{d'} = \frac{z_a + z_b}{z_a} = 1 + \frac{z_b}{z_a}$$

To find the overall magnification, it is necessary to known $z_b$. Consider the distribution of the light on the object to be a function $s$ of $x$ and $y$, i.e., $s(x,y)$. The light passing the distance $z_2$ from the object to the detector and carrying the Fresnel diffraction pattern is represented by $s_o(x,y)$ and $$s_o(x,y) = s(x,y) * \frac{i}{\pi \lambda} e^{j \frac{\pi}{\lambda z_2}(x^2+y^2)}$$

*indicating convolution.

The second beam introduces a wave $e^{i\alpha x}$, and the two beams are summed and the square-law detected, producing $$|e^{i\alpha x} + s_o|^2 = 1 + s_o^2 + = 2\, Re(s_o e^{i\alpha x})$$

In the reconstruction process, the final term produces $$s_o e^{i\alpha x} + (s_o e^{i\alpha x})^*$$

*indicating that the term is a complex conjugate.

The first term is a replica of the original wave front which the plate recorded and, therefore, represents diverging wavelets and produces a virtual image. The second term represents converging wavelets and produces a real image, which, of course, can be photographed without the need for any lenses.

To continue with the calculation of the magnification, the light scattered from a point on the object produces at the off-axis hologram the exponent $$\exp\left[-j\frac{\pi}{\lambda z_2}(x^2+y^2)\right]$$

while for the reference beam, we have $$\exp\left\{-j\left[\frac{\pi}{\lambda(z_1+z_2)}(x^2+y^2)+\alpha x\right]\right\}$$

The recorded zone plate is of the form $$\cos\left[\frac{\pi}{\lambda}(x^2+y^2)\left(\frac{1}{z_2}-\frac{1}{z_1+z_2}\right)+\alpha x\right]$$

The recorded off-axis hologram thus has a focal length $$f_h = \frac{1}{\frac{1}{z_2} - \frac{1}{z_1+z_2}}$$

$$= \frac{z_2(z_1+z_2)}{z_1}$$

The distance $z_b$ is then found by applying the lens formula (where the reciprocal of the object distance plus the reciprocal of the image distance equals the reciprocal of the focal length of the lens) to give the zone plate $$\frac{1}{z_b} + \frac{1}{z_a} = \frac{1}{f_h} = \frac{z_1}{z_2(z_1+z_2)}$$

$$\frac{1}{z_b} = \frac{z_1 z_a - z_2^2 - z_2 z_1}{z_a z_2(z_1+z_2)} \qquad (12)$$

The total magnification is $$M = M_1 M_2$$

and from equations (10) and (11) and substituting the value of $z_b$ of equation (12) into equation (11), we have $$M = \left(\frac{z_1+z_2}{z_1}\right)\left(1 + \frac{z_2(z_1+z_2)}{z_1 z_a - z_2^2 - z_2 z_1}\right)$$

$$= \frac{z_a(z_1+z_2)}{z_1 z_a - z_2(z_1+z_2)} \qquad (13)$$

To make subsequent analysis easier, suppose that during the reconstruction step we make $z_1$ equal $z_a$, i.e., the developed off-axis hologram 63' is put back in the same position in FIG. 17 as the object in FIG. 16 had when the off-axis hologram was made. This gives, $$M = \frac{1+p}{1-p-p^2} \qquad (14)$$

where $p$ equals $z_2/z_1$, and from equation 12

$$\frac{1}{z_b} = \frac{1-p-p^2}{p(z_1+z_2)}$$

another useful expression is $$\frac{1}{z_b} = \frac{1}{z_2} \frac{1-p-p^2}{1+p} = \frac{1}{Mz_2}$$

so that $$z_b = Mz_2 \qquad (15)$$

Now $z_b$ must be positive if a real image is to be produced, and $z_1$ and $z_2$ are both positive. Therefore, it is required that $$1-p-p^2 > 0$$

which requires that $$0 < p < (\sqrt{5}-1)/2 \approx 0.62$$

The lower bound of 0 occurs because $p$ is always positive. As an example, if $p$ equals 0.6166 (where $z_2$ equals 30.85 mm. and $z_1$ equals 50 mm.) from equation (14)

$$M = \frac{1-.6166-}{1-.6166-(.6166)^2} = 504 \text{ times}$$

and from equation (15)

$$Z_b = 15.55 \text{ meters.}$$

FIG. 18 shows a complete microscope wherein the off-axis hologram is formed and reconstructed immediately or shortly thereafter depending upon the composition of the detector. Two lenses 64 and 66 each bring an incident beam from a coherent source 54 to a separate point focus 53 and 53', respectively. A pinhole and shutter combination 68 is positioned at point focus 53 which diverges to form the reference beam 65 and the point focus 53 is positioned at a distance $z_2$ from the detector 63. A pinhole and shutter combination is also positioned at point focus 53' which diverges to illuminate the object 55 positioned at a distance $z_o$ from the point source 53'. The object 55 is positioned at a distance $z_1$ from the detector 63. The diverging-object bearing beam 61 and diverging reference beam 65 interfere to form the off-axis hologram 63' on the detector 63.

It is readily appreciated that the instrument of FIG. 18 is most useful if the detector 63 need not be removed and developed chemically. There are various self-developing films which are usable and these are divided into two classes: those which return to the original, unexposed state when, or shortly thereafter the exposing illumination is removed, and those which do not. When the detector 63 has recorded the off-axis hologram, shutter 70 is closed and the reference beam 65 becomes a diverging reconstruction beam (whose point source is positioned at a distance $z_a$ from the off-axis hologram 63') and produces the enlarged real and virtual images positioned at a distance $z_b$ from the off-axis hologram 63'. The reconstruction occurs in the same manner as shown in FIG. 9 except that the real image carrying beam 69 and the virtual image carrying beam 71 are diverging.

Enlargement of the images is also accomplished by using a short wavelength radiation for forming the off-axis hologram and reconstructing with a longer wavelength radiation. For example, one can form the off-axis hologram with X-rays and view the image with visible light, or form the off-axis hologram with blue light and view in red light. The magnification process is readily shown to be $$M = \left(\frac{1}{p} - \frac{1}{p}\frac{z_1}{z_2} - p\frac{\lambda_1 z_1}{\lambda_2 z_0}\right)^{-1} \qquad (16)$$

where $\lambda_1$ is a wavelength of radiation used in making the off-axis hologram and $\lambda_2$ is the wavelength used in reconstruction. The factor $p$ is whatever magnification is imparted to the off-axis hologram by, for example, photographic enlargement or an electronic rescanner.

It is also possible to adapt the device of FIG. 18 so that the off-axis hologram is formed and moved to a second position where it is reconstructed, as shown in FIG. 19. A short wavelength coherent source 54 is brought to a point focus 53 by lens 64 and a point focus 53' by lens 66. Point focus 53 supplies the diverging reference beam 65 and point focus 53' illuminates object 55 to produce a diverging object-bearing beam 61. The off-axis hologram is recorded by strip detector 63, unwound from a supply spool 73 to a storage spool 75, and is removed through a process chamber 77 (unless the detector 63 is self-processing). The off-axis hologram 63' is then illuminated by a diverging incident beam 59 from a point source 53'' formed by lens 64' and the light from a long wavelength coherent source 54'. The magnification produced is a result of both diverging light and change of wavelength. The microscope could actually be used as a three-dimensional manipulating microscope with very little time lag, if the film was moved fairly rapidly and intermittently similar to movie film, and the lasers were pulsed lasers.

As previously noted, it is also possible by this invention to produce a number of off-axis holograms from different objects on a single photographic plate. FIG. 20(a) is a diagram showing a coherent source of light 81 and its incident beam 83 illuminating a first object 85 and a prism 87. The prism 87 is placed below the first object 85 to deflect the beam from the coherent light source through an angle $\theta$. The object-bearing beam 89 (shown by the dotted line) and reference beam 91, are passed to the photographic plate 93 and form a pattern of interference fringes or a diffraction grating oriented horizontally and indicated by the lines 95–95 (although such lines would not be apparent on the developed film). As shown in FIG. 20(b), after the first exposure is completed, a second object 97 is placed in the incident beam 83 with both the second object 97 and the photographic plate 93 in the same position as the first object 85 and photographic plate 93 were positioned for the first exposure. The prism 87 is now placed to one side of the second object 97 so that the incident beam is deflected through an angle $\Phi$. A second object-bearing beam 99 and a second reference beam 101 are passed to the photographic plate 93 and form a second pattern of interference fringes or a second diffraction grating oriented vertically and indicated by the lines 103–103 on the photographic plate 93. After the photographic plate 93 is developed to bring out the complex off-axis hologram (95—103), the developed plate 93' is again positioned in the incident beam 83 of coherent alight as shown in FIG. 21. A real image 105 of the first object will appear at an off-axis angle below the off-axis hologram 95—103 on the side opposite the incident beam 83. The virtual image 107 of the first object will be positioned at an off-axis angle $\theta$ below the off-axis hologram (95—103) in a plane between the light source 81 and the off-axis hologram (95—103) (assuming that the light source is a sufficient distance from the off-axis hologram). The virtual image 107 can be viewed by positioning the eyes at an off-axis angle $\theta$ above the off-axis hologram (95—103) on the side opposite the laser beam 83. The real image 109 of the second object 97 is positioned at an angle $\Phi$ with the incident beam and on the same side of the off-axis hologram (95—103) as virtual image 107, i.e., between the off-axis hologram (95—103) and the coherent light source 81. The virtual image 111 can be viewed by positioning the eyes at an off-axis angle $\Phi$ on the opposite side of the off-axis hologram (95—103) that is illuminated by the incident light. When the real image 109 appears at an angle $\Phi$ on the right side of the off-axis hologram (95—103), the virtual image 111 is viewed at an angle $\Phi$ on the left side of the off-axis hologram (95—103). Additional "stacking" of off-axis holograms to form an even more complex off-axis hologram is accomplished by simply continuing to expose the plate 93 to one object after another while reorienting the reference beam (in this example, reorienting the prism 87) at different angles or positions or both for each object.

An extension of the above method may be applied to produce images in color. The preceding description has related only to monochromatic light. FIG. 22 shows a method of producing color images with black and white photosensitive material such as simple black and white film. A plurality of different colored coherent light sources, for example, a red laser 121 (meaning a laser that produces radiations in the red area of the visible spectrum), a yellow laser 123, and a blue laser 125, are all positioned to illuminate an object 127. The red light 129 (shown by the unbroken line) passes to the object 127 and a first prism 131 positioned, in this example, at the side of the object 127. Only the red light 129 is permitted to pass through the first prism 131. The yellow light 133 (shown by the dashed lines) illuminates the object 127 and a second prism 135 positioned, in this example, at a 45° angle to the horizontal axis of the object. The blue light 137 (shown by the dotted line) illuminates the object 127 and a third prism 139 placed below the object. Only the yellow light 133 illuminates the second prism 135 and only the blue light 137 illuminates the third prism 139. The object 127 and prisms 131, 135, and 139 are positioned in a plane at a distance $d_1$ from the light sources 121, 123, and 125. A combination of six light patterns is transmitted to the black and white sensitive photographic plate 141 positioned at a distance $d_2$ from the object 127. The six light beams are: (1) a red object-bearing beam 143, (2) a red reference beam 145, (3) a yellow object-bearing beam 147, (4) a yellow reference beam 149, (5) a blue object-bearing beam 151, and (6) a blue reference beam 153. Each pair of beams, red (143, 145), yellow (147, 149), and blue (151, 153), produces a pattern of interference fringes each oriented in a separate way on the photographic plate 141. For purposes of description, they will be referred to as the red, yellow, and blue off-axis holograms, respectively (although actually the off-axis holograms are black and white and are the off-axis holograms formed by the red, yellow, and blue light, respectively). The plate 141 is eventually removed, developed, and then repositioned in the same location as in FIG. 22, at a distance $d_2$ from the object 107 position. The prisms 131, 135, and 139 remain at their same angular orientation and distance position ($d_1$) to the laser light sources 121, 123, and 125. (Of course, if one wishes, the position arrangement of each part can be recorded or redetermined for the reconstruction step). The only difference in the light arrangements between the off-axis hologram forming step and the reconstruction step is that an opaque screen is placed in the position formerly occupied by the object 127 so that the only incident light passing through the complex off-axis hologram is from the prisms 131, 135, and 139 (formerly the reference beams). The result is an on-axis three-dimensional image in color (assuming that the object is three-dimensional). The virtual colored image is located on an axis between the off-axis hologram and the opaque screen and is viewed from the side of the plate opposite the illuminating source. A real color image is formed in the on-axis position on the side of the plate opposite the virtual image.

The above method also operates successfully with an opaque object and using mirrors instead of prisms. The image will be in color as long as one directs the incident beams for reconstruction onto the complex off-axis hologram at the same angle that the reference (reflected) beams had for forming the off-axis hologram.

An interesting feature of the method described for producing color images is that when viewing the virtual color image, other virtual images may appear in off-axis positions, as shown in FIG. 23. As one views the color image 157, six additional virtual images are lying on three different axes: a red off-axis hologram axis 159, a yellow off-axis hologram axis 161, and a blue off-axis hologram axis 163. (This is purely an arbitrary assignment of terms, indicating merely that the images lying on each axis are derived from the off-axis holograms formed by the red, yellow, and blue light, respectively). On the red off-axis hologram axis 159 there is a yellow image 165 and a blue image 167 resulting from the yellow light and blue light, respectively, striking the diffraction grating of the red off-axis hologram. On the yellow off-axis hologram axis 161, there is a red image 169 and a blue image 171, resulting from the red light and blue light, respectively, striking the yellow off-axis hologram. On the blue off-axis hologram axis 163, there is a yellow image 173 and a red image 175, resulting from the yellow light and red light, respectively, striking the blue off-axis hologram.

The explanation of the six "extra" images 165, 167, 169, 171, 173, and 175 is shown in FIG. 24. If light is passed directly from all three lasers 121, 123, and 125 (without the prisms) and the complex off-axis hologram is viewed from the side opposite the three laser beams, there will be 18 images in all, nine virtual images and nine real images. The reference numerals applied to the elements in FIG. 23 are carried over and applied to the same elements in their changed positions in FIG. 24, for purposes of comparison. The color image 157 has been destroyed but can be reconstructed again. When a complex off-axis hologram is produced by the color method of FIG. 22, each off-axis hologram that was formed by one color produces a real and a virtual image for each color used in the reconstruction. Each image of FIG. 24 has been given two letter designations. The real images will be focused in front of the off-axis hologram (referring to the front as the side opposite the illuminating light and the back, or behind the off-axis hologram, as the illuminated side) and the virtual images behind the off-axis hologram. However, the virtual images are viewed by placing the eyes in the position (upper right) shown in FIG. 24 at about the distance $d_2$ in front of the complex off-axis hologram, while a print from a real image is made in the position of the real images located in the (lower left) positions and at a distance $d_2$ in front of the off-axis hologram as shown in FIG. 24.

Note in FIG. 24 that if the point of a compass were placed at the intersection of the three axes 159, 161, and 163, a circle could be drawn with its circumference intersecting all the images that have B for the first letter. The same is true for all the images that have Y for their first letter and it is also true for all the images that have R for their first letter. The first letter of each image designates its color (and the color of the incident beam reconstructing it) and the second letter designates the off-axis hologram (the off-axis holograms formed by the red, yellow, and blue light in FIG. 22) the image is derived from. The virtual images of FIG. 24 are positioned differently than they are in FIG. 23 because FIG. 23 shows the image positions as they appear when the complex off-axis hologram is reconstructed with the light from each laser 121, 123, and 125 passing through the prisms 131, 135, and 139, respectively, with the prisms 131, 135, and 139 in their original positions of FIG. 22. FIG. 24 is a pattern of the virtual images (in the upper right portion of the diagram) when the light from the three lasers 121, 123, and 125 illuminates the complex off-axis holograms directly. When the red incident light reaches the complex off-axis hologram it produces three virtual images: one from the red off-axis hologram, which is a red image 177 and is labeled RR in FIG. 24 (in this image 177, everything that was red in the object 127 will appear properly red); another image is formed by the red incident light in the yellow off-axis hologram, which is also a red colored image (169) and is labeled RY in FIG. 24 (everything that was yellow in the object 127 will appear red in the image 169); and a third image 175 is formed by the red light and blue off-axis hologram and is labeled RB in FIG. 24 (everything that appeared blue in the object 127 will appear red in the image 175). There are also three images 165, 173, and 169 formed when the yellow incident light illuminates the complex off-axis hologram. Image 179 is from the yellow incident light and yellow off-axis hologram and is labeled YY in FIG. 24. The other two images 165 (YR) and 173 (YB) are formed from the yellow incident light illuminating the red and blue off-axis hologram, respectively. In image 165, the reds of the object 127 will appear yellow, and the blues of the object 127 will appear yellow in image 173. Finally, the blue incident light produces images 167, 171, and 181 when the blue incident light illuminates the complex off-axis hologram. The image 181 (BB) is formed from the blue incident light and the blue off-axis hologram (everything in the object 127 that was blue is blue in image 181). In images 167, the reds, and in image 171, the yellows of the object 127 appear blue. The red-appearing images 169, 175, and 177 are positioned further from the intersection of the three axes 159, 161, and 163, because the red light wavelength is longer and is diffracted more by the diffraction grating of each off-axis hologram making up the complex off-axis hologram. The blue light wavelength is shorter and the blue images 167, 171, and 181 appear closest to the intersection of the axes 159, 161, and 163. The circle 183 in the center of the diagram of FIG. 24 represents the extraneous terms formerly mentioned in the discussion of FIG. 9.

When the prisms 131, 135, and 139 are placed in the original position of FIG. 22 for the reconstruction, the images from each off-axis hologram are displaced along the respective axes to give the position shown in FIG. 23, where the RR image 177, and the YY image 179, and the BB image 181 are superimposed to form the color image 157. Interesting features of illuminating the complex off-axis hologram through the prisms are (1) that the color image 157 appears and (2) the colors in the color image can be selected by moving the prisms to change the angle of the incident beam of a particular color that is illuminating the complex off-axis hologram and thereby move one image out of position in the superimposed image 157 and another image into the superimposed image 157 (assuming one compensates for enlargement of images due to changes of wavelength by diverging or partially focusing the various beams as required). For example, suppose the angle of the yellow incident beam is changed so as to move the YY image 179 out and the YB image 173 into the superimposed image 157. The color of the image 157 would be changed to the effect that the yellow parts would lose their yellow tones and the yellow would be superimposed on the blues, changing them to green. Another method of changing the color of the color image 157 is by adding other prisms to the incident-beam system and simply bringing another image into the superimposed image 157. For example, a second incident beam of yellow light could be added through a fourth prism adjusted in such a manner as to simply bring the YB image 173 into superposition with the images 177, 179, and 181. The image 157 now being comprised of images 173, 177, 179, and 189, would have yellow again superimposed on the blue, with the overall yellows still retained. As a result of this "image changing," one can "paint" the image 157 almost any color desired and also change the color of the real image by superimposing selected real images in the same manner.

In some instances, especially with very large off-axis holograms several feet in height and width, one would like to form the off-axis hologram with the reference beam striking the detector at a relatively small angle with respect to the object-bearing beam. This would allow a large group of individuals to view the virtual image simultaneously and be relatively close to the off-axis hologram "window." The problem with this approach is that the zero-order terms and first-order terms of the virtual image would be overlapping resulting in a poor virtual image. FIGS. 25 and 26 show methods of allowing one to filter the zero-order term and view the virtual image (or project the real image) in the zero-order term area.

In FIG. 25, the off-axis hologram 33' is positioned for reconstruction (as in FIG. 9) with the off-axis hologram 33' illuminated by an incident beam 23 from a coherent light source 21. The angle $\theta$ in this instance was selected to be relatively small. Grids 185 and 187 are positioned "in front of" the off-axis hologram 33' at a distance $d$ apart and are situated so that all rays from the zero-order image are blocked off by one or the other of the grids (185, 187). The grid lines are fine enough that they are invisible to the viewer, but are coarse enough that the first grid 185 does not diffract the zero-order beam around the opaque regions of the second grid 187. The shaded area 189 indicates the new area that is now available for viewing the virtual image. Such an arrangement is especially useful for three-dimensional movies and three-dimensional TV. In FIG. 26, the same result is obtained by replacing the gratings 185 and 187 with the plurality of vanes 191–191 adjusted to filter out the zero-order beam.

A wide beam of light striking a conventional lens parallel to its axis does not focus at a unique point. Fuzzy and distorted images of conventional optical systems are the result of some type of aberration. Both chromatic and monochromatic aberrations contribute to problems in optical systems, and of the two, monochromatic aberrations usually give the lens maker the most costly problems. In the theory converging monochromatic aberrations, the deviation of any light ray from its prescribed path is expressed in terms of five sums, $S_1$ to $S_5$, called Seidel sums. If a lens were to be free of all aberrations, all five of these would have to be simultaneously and individually equal to zero. With geometrical objects, no optical system can be made to satisfy all these conditions at one time. The sums are therefore treated separately. The aberrations known as the five monochromatic aberrations are: spherical aberration, coma, astigmatism, curvature of field, and distortion. The conventional method of eliminating such aberrations is usually accomplished by constructing a lens from a multiplicity of simple elements, producing doublet, triplet lenses, etc. or by, for example, Schmidt corrector plates.

The method of this invention allows the lens or optical system to "correct itself" by making an off-axis hologram of the system, including its aberrations, and then using the off-axis hologram referred to as a "phase plate," as a diffraction grating to produce a highly aberration-corrected optical system. This, of course, is accomplished for merely the cost of the photographic plate and the time required to make the actinogram.

FIG. 27 is a diagram illustrating the method of producing a phase plate. A coherent light source 201 is placed in the object plane 203 at a distance $z_1$ from the lens or optical system 205. The incident beam 207 illuminates the optical system 205 and a prism 209. The distance $z_1$ determines the plane in which a real image forms with a particular optical system so that the real image plane 211 is located at a distance $d_2$ from the optical system 205. The distance $z_1$ establishes the distance $d_2$. $z_1$ may, in some optical systems, be variable by only a few millimeters, as in the case of a microscope. Or many miles as in the case of a telescope. After $d_2$ is determined, a photographic plate 213 is positioned between the optical system 205 and the real image plane 211 at a distance $d_1$ from the optical system 205 and $d_1$ is less than $d_2$. The object-bearing beam 215 from the optical system 205 and the reference beam 217 deflected at an angle $\theta$ by the prism 209, form a pattern of interference fringes on the photographic plate 213.

After the photographic plate 213 is developed, the off-axis hologram or phase plate 213' is replaced substantially in its original position with respect to the optical system 205, i.e., at a distance $d_1$ from the optical system 205, as shown in FIG. 28. With the phase plate 213' in position, any object 219 placed in the object plane 203' at a distance $z_2$ from the optical system will form an uncorrected real image 221 in the conventional position and a corrected real image 223 in an off-axis position by the angle $\theta$. The real image plane 211' will be located at a distance $d_3$, depending on the distance $z_2$. The light for illuminating the object 219 should in this case be monochromatic light, since the phase plate 213' is not chromatically corrected. The phase plate 213' has the recorded aberration "-patterns" of the optical system 205 and these "patterns" diffract the light from the optical system to the off-axis position omitting the aberrations. The phase plate 213' can now be considered a part of the optical system 205 to form an aberration-corrected optical system 205'.

FIG. 29 is a diagram of another optical arrangement used to make a phase plate. Often the necessary position of the photographic plate is very close to the optical system and would require a sharp angle for the reference beam. The diagram also indicates the practical use of a laser that emits a thin pencil of radiation, which, by itself would be too narrow for practical use. The focusing lens 231 is positioned in the pencil beam 233 of a laser 235 to bring the beam 233 to a focus and subsequently create a diverging beam 237. A pinhole 239 is positioned at the point focus and aids in eliminating any aberrations from the lens 231. Approximately half of the diverging beam 237 is separated from the remainder of the beam 237 by two mirrors 241 and 243 to form an incident beam 245. The incident beam 245 is focused to a point by a lens 247 and then diverges until it strikes the optical system or low quality lens 249. The point focus of lens 247 coincides with the focal point of lens 249. The correction plane 251 lies a distance $d_1$ from the low quality lens 249 in the object-bearing beam 253. The plane wherein the phase plate would ordinarily be positioned for correction is projected a distance $d_2$ by two lenses 255–255. (Projecting the plane of correction allows the angle between the reference beam and object-bearing beam to be kept smaller.) A photographic plate 257 is positioned in the projected correction plane 251' to receive the object-bearing beam 253. The reference beam is collimated by a lens 259 and passed to a mirror 261 which reflects it to the plate 257. Lenses 247 and 255–255 must be good quality lenses. For further improvement, the focus of each lens should be observed by a microscope and the aperture then stopped down until a good point focus appears.

The grating or phase plate produced from the plate 257 according to FIG. 29 is positioned in the optical system so that the light passes through the phase plate and then the lens (see FIG. 30), the phase plate 257 being positioned at the distance $d_1$ (in FIG. 29) from the lens.

To produce an aberration corrected optical system that can use white light, i.e., where monochromatic light is unnecessary, a second grating is required. FIG. 30 shows the effect of using two gratings. The first grating 265 is not modulated by the low quality lens errors and has the same spatial frequency as the phase plate 276 which is modulated by the low quality lens errors. (This is accomplished by making two gratings, both in the manner described in FIG. 29 with the exception that the first grating is made without the low quality lens in the system (a high quality lens of the same focal length and aperture is substituted for the low quality lens) so that the same reference beam is used for both gratings, thus they have the same spatial frequency.) It should be recalled that the aberration corrections occur in the sideband or first-order diffraction of the phase plate. Thus if one grating diffracts the white light in one direction (and the red portion of the spectrum is diffracted more than the blue portion of the spectrum) and the other grating diffracts the same amount in the opposite direction, the rays emerge parallel to one another and are focused by the corrected low quality lens.

FIG. 30 shows an individual ray of white light 269 (in a plurality of rays reflected from an object) passing through the first unmodulated diffraction grating 265. The ray 269 is diffracted and the red end of the spectrum is diffracted more than the blue as shown by the blue ray 271 and red ray 273 (although the effect is exaggerated in the diagram). The grating that is modulated by the lens errors (i.e., the phase plate 276) is positioned in the first order diffraction beam of the unmodulated grating 265 in such a manner that the desired light from grating 265 will be diffracted in the opposite direction by grating 276 and through the low quality lens 269. Both rays are then brought to a focus point 275.

FIG. 31 shows the addition of a prism 279 to a phase plate optical system in order that white light may be used. In this instance the white ray 269 passes through the prism 279 and is *refracted* wherein the blue end of the spectrum "bends" more than the red end. Now, the diffraction grating or phase plate 267 is positioned to *diffract* the light in the same direction as it was refracted by the prism 279. Since the red is diffracted more than the blue, the rays are again brought essentially parallel for focusing to the point 275.

If one wishes to ensure that the prism 279 does not add aberrations to the optical system, then the prism 279 should be included in the system with the low quality lens 269 to modulate the phase plate 267 when the phase plate is produced in accordance with FIG. 29 the prism 279 would be positioned between the lens 249 and plate 257, and, of course, the plate 257 would need to be repositioned because of the refraction of the prism 279.

FIG. 32 shows a method and apparatus for producing long strip off-axis holograms. A camera or light tight box 301 is provided with means for movement such as wheels 303 on a track 305 (the top of the box 301 is removed to show the structure inside the box). A drive mechanism 307 moves the box 301 along the track 305. A strip of film 309 passes from a first film spool 311 to rollers 313 and 315 and onto a second spool 317. A portion of the film 309 is exposed as it passes an opening 319 in the side of the box 301 or, perhaps more correctly, as the opening 319 passes the film 309. In producing an off-axis hologram the detector must be held stationary with respect to the light sources impinging upon it. This is accomplished in FIG. 32 by providing guide rails 321-321 that pass through the box 301. The rollers 313 and 315 roll along the guide rails 321-321 so that the film strip 309 is pressed onto the rails 321-321 for exposure and subsequently removed and stored after exposure with the effect that the opening 319 acts as an aperture that moves along to expose a stationary strip of film. An object or scene 320 is positioned to reflect light to the opening 319 being illuminated by a coherent light source 325 positioned behind the camera 301. A reflector 327 is positioned to provide a reference beam which it reflects to the opening 319 from the coherent source 325. The track 305 and rails 321-321 could also be curved to position the film 309 closer and farther away from the scene as the camera 301 moves along the track 305.

A portion of the off-axis hologram produced in the above manner is positioned in an incident beam of coherent light as in FIG. 9. When the strip is moved across the beam of incident light, one would get the same effect that is obtained by looking out the window of a moving automobile. The near items in the scene would be passing rather rapidly while the distant ones would stay in view for a longer period of time. Curving the track and rails would, in the reconstruction, make it appear that one approached and receded from the scene as it moved by. The width of the opening 309 is determined by the rate of camera speed along the rails and the desired exposure time.

In producing off-axis holograms, the interference maxima and minima occurring between the two beams consistently occurs at the same point on the detector. With average lasers and emulsions, exposure times are on the order of early conventional photographic exposure times of about ten seconds or more (with pulsed lasers, an off-axis hologram is produced with one pulse). If the detector or object moves slightly during exposure, the image is altered. If the movement is not too great, the image formed by the diffraction from the off-axis hologram is altered in a manner that is characteristic of the motion itself. This pattern is used to analyze the vibration of an object. The object can be of any shape and its surface can be either specularly or diffusely reflecting.

The method of reconstruction of off-axis holograms shown in FIG. 33 is as practical as that shown in FIG. 9, i.e., illuminating the off-axis hologram with the incident light at the angle θ so that the desired image appears on-axis or is viewed perpendicular to the off-axis hologram. Customarily one wished to reconstruct only one image (for observation, photographing, etc.) at one time, therefore, the method of reconstruction of FIG. 33 is used frequently in normal reconstruction.

It should be noted that the beam that illuminates the object and the reference beam described with respect to the various methods and apparatus discussed herein need not originate from a single laser since present technology includes the ability to lock two lasers in phase so that light from the separate lasers each produces a beam and the beams are coherent with respect to one another.

It will be understood, of course, that, while the forms of the invention herein shown and described constitute preferred embodiments of the invention, many others are possible and it is not intended herein to illustrate all of the possible equivalent forms or ramifications of the invention. It will also be understood that the words used are words of description rather than of limitation, and that various changes, such as changes in shape, relative size, and arrangement of parts or steps may be substituted without departing from the spirit or scope of the invention herein disclosed.

We claim:

1. A method of producing an off-axis hologram comprising the steps of:
   a. directing a beam of coherent radiation onto diffusion means to produce a diffused portion and a nondiffused portion of said coherent radiation;
   b. transmitting both of the diffused and nondiffused portions through focusing means for focusing only the nondiffused portion of said coherent radiation to a point;
   c. positioning an object to receive the diffused portion of said coherent radiation, said object being positioned in a plane that includes the focus point of said nondiffused portion of radiation and to one side thereof so that the radiation emanating from said object as an object-bearing beam and from said focus point as a diverging reference beam are directed along axes angularly displaced to interfere with each other in a plane parallel to said first-named plane; and
   d. recording in said plane parallel to said first-named plane the pattern of interference fringes produced by the interference of the radiation emanating from said object and from said focus point.

2. A method of producing an off-axis hologram comprising the steps of:
   a. illuminating a partially diffusing means with coherent light concurrently to produce diffused light and nondiffused light;
   b. directing both the diffused and nondiffused light to a first lens for focusing only the nondiffused light to a point;
   c. positioning an object to receive the diffused light transmitted through said first lens from said partially diffusing means, said object being positioned in a plane that includes the focus point of said first lens and to one side thereof;
   d. directing the light emanating from said object as an object-bearing beam and the nondiffused light from said focus point as a diverging reference beam onto a second lens and along axes angularly displaced to interfere with each other in a predetermined plane; and
   e. positioning a detector sensitive to light to receive and record the light passing through said second lens from the object and said focus point, said object light and point focus light producing a pattern of interference fringes at said detector.

3. Apparatus for producing an off-axis hologram comprising:
   a. a coherent light source for producing an incident beam of light;
   b. a partially diffusing plate positioned for illumination on one side thereof by said coherent light concurrently to produce at the other side thereof diffused light and nondiffused light;
   c. a first lens positioned to receive both the diffused and the nondiffused light for focusing only the nondiffused light to a point;
   d. means for positioning an object to receive the diffused light from said partially diffusing plate, the object being positioned in a plane that includes the focus point of said first lens and to one side thereof;
   e. a second lens positioned to receive the light emanating from the object and the diverging beam of nondiffused light from said focus point for direction thereof along axes angularly displaced to interfere with each other in a predetermined plane; and f. photosensitive recording means positioned to receive a record of the light passing through said second lens from said object and said focus point so that said object light and said point focus light produce a pattern of interference fringes at said photosensitive recording means.

4. A method of producing an off-axis hologram according to claim 1 including the step of collimating the radiation from the reference beam prior to its arrival at the recording plane.

5. A method of producing an off-axis hologram and reconstructing one or more images of an object recorded by said off-axis hologram comprising the steps of:
   a. directing a beam of coherent radiation onto diffusion means to produce a diffused portion and a nondiffused portion of said coherent radiation;
   b. transmitting both of the diffused and nondiffused portions through focusing means for focusing only the nondiffused portion of said coherent radiation to a point;
   c. positioning an object to receive the diffused portion of said coherent radiation, said object being positioned in a plane that includes the focus point of said nondiffused portion of radiation and to one side thereof so that the radiation emanating from said object as an object-bearing beam and from said focus point as a diverging reference beam are directed along axes angularly displaced to interfere with each other in a plane parallel to said first-named plane;
   d. recording in said plane parallel to said first-named plane the pattern of interference fringes produced by the interference of the radiation emanating from said object and from said focus point;
   e. illuminating the hologram with coherent radiation as an illuminating beam, thereby producing at least one image of the object; and
   f. detecting said image of the object along an axis displaced from the illuminating beam by an angle corresponding substantially to the angular displacement between the object-bearing beam and the reference beam when said hologram was produced.

6. A method of producing an off-axis hologram according to claim 1 including positioning a light blocking screen in said first-named plane, said screen having a pinhole located at said focus point for blocking the remainder of the diffused light while allowing the nondiffused light from the pinhole and the diffused light received by the object to pass to said plane parallel to said first-named plane.

7. Apparatus for producing an off-axis hologram according to claim 3 including a light blocking screen positioned in said first-named plane, said screen having a pinhole located at the focus point of said first lens for blocking the remainder of the diffused light while allowing the nondiffused light from the pinhole and the diffused light received by the object to pass to said second lens.

PO-1050
(5/69)

UNITED STATES PATENT OFFICE
CERTIFICATE OF CORRECTION

Patent No. 3,580,655     Dated May 25, 1971

Inventor(s) Emmett N. Leith and Juris Upatnieks

It is certified that error appears in the above-identified patent and that said Letters Patent are hereby corrected as shown below:

Column 2, line 57, correct the following "$10^{111}$ cm. to $10^{11}$ cm." to -- $10^{-11}$ cm. to $10^{-1}$ cm.-- line 59, correct the following "4 x $10^{15}$ cm. and 7.2 X $10^5$" to -- 4 X $10^{-5}$ and 7.2 X $10^{-5}$--.

Column 4, line 46, change the word "simple" to --simply--.

Column 6, line 11, correct the following "(in about $10^{18}$ seconds)" to --(in about $10^{-8}$ seconds)--.

Column 7, line 42, after the word "angle" insert the Greek letter Theta --$\theta$--.

Column 8, line 73, correct the following:

"$=T_o - ka_o^2 - ka^2 - ka_o a \cos(\alpha X - \phi)$" to

--$T_o - ka_o^2 - ka^2 - 2ka_o a \cos(\alpha X - \phi)$--

Column 10, line 41, change "actinogram" to --off-axis hologram--; same line change actinogram second occurrence to --off-axis hologram--.

Column 12, line 48, change "$z_1$" to --$z_a$--.

PO-1050
(5/69)

UNITED STATES PATENT OFFICE
CERTIFICATE OF CORRECTION

Patent No. __3,580,655__   Dated __May 25, 1971__

Inventor(s) __Emmett N. Leith and Juris Upatnieks__   Page - 2

It is certified that error appears in the above-identified patent and that said Letters Patent are hereby corrected as shown below:

Page #2 (contd)

Column 13, line 10 correct the spelling of "know".

line 21, the equals sign "=" second occurrence should be omitted.

Column 14, line 25, correct the upper line of the equation to read as follows: --1 + .6166 --.

Signed and sealed this 12th day of February 1974.

(SEAL)
Attest:

EDWARD M. FLETCHER, JR.
Attesting Officer

C. MARSHALL DANN
Commissioner of Patents